(12) United States Patent
Lindbergh et al.

(10) Patent No.: US 6,240,140 B1
(45) Date of Patent: May 29, 2001

(54) CHANNEL AGGREGATION HAVING LOW LATENCY AND OVERHEAD

(75) Inventors: David J. Lindbergh, Reading; Jeffrey G. Bernstein, Middleton, both of MA (US)

(73) Assignee: PictureTel Corporation, Andover, MA (US)

( * ) Notice: Subject to any disclaimer, the term of this patent is extended or adjusted under 35 U.S.C. 154(b) by 0 days.

(21) Appl. No.: 09/028,714

(22) Filed: Feb. 24, 1998

Related U.S. Application Data

(60) Provisional application No. 60/038,964, filed on Feb. 24, 1997.

(51) Int. Cl.[7] .............................. H04K 1/10; H04L 27/28
(52) U.S. Cl. .......................... 375/260; 455/62; 370/431; 370/329
(58) Field of Search ..................... 370/464, 465, 370/522, 543, 544, 252, 253, 431, 433, 389, 329, 332; 375/260, 259, 224; 455/422, 62, 63, 67.1

(56) References Cited

U.S. PATENT DOCUMENTS

| | | | |
|---|---|---|---|
| 5,058,133 | * 10/1991 | Duncanson et al. . | |
| 5,231,649 | * 7/1993 | Duncanson . | |
| 5,278,826 | 1/1994 | Murphy et al. | 370/76 |
| 5,521,902 | 5/1996 | Ferguson | 370/13 |
| 5,521,924 | 5/1996 | Kakuma et al. | 370/94.2 |

* cited by examiner

*Primary Examiner*—Chi Pham
*Assistant Examiner*—Jean B. Corrielus
(74) *Attorney, Agent, or Firm*—Foley, Hoag, Eliot, LLP Patent Group

(57) ABSTRACT

A system and method communicate a single stream of data using an arbitrary and time-varying number of channels of arbitrary, differing, and time-varying bit-rates. A transmitter and a receiver both including finite state machines capable of synchronizing the pattern by which data is sent onto and read from the channels. The finite state machines are capable of dynamically adjusting for changes in the number and data rate of the channels.

33 Claims, 19 Drawing Sheets

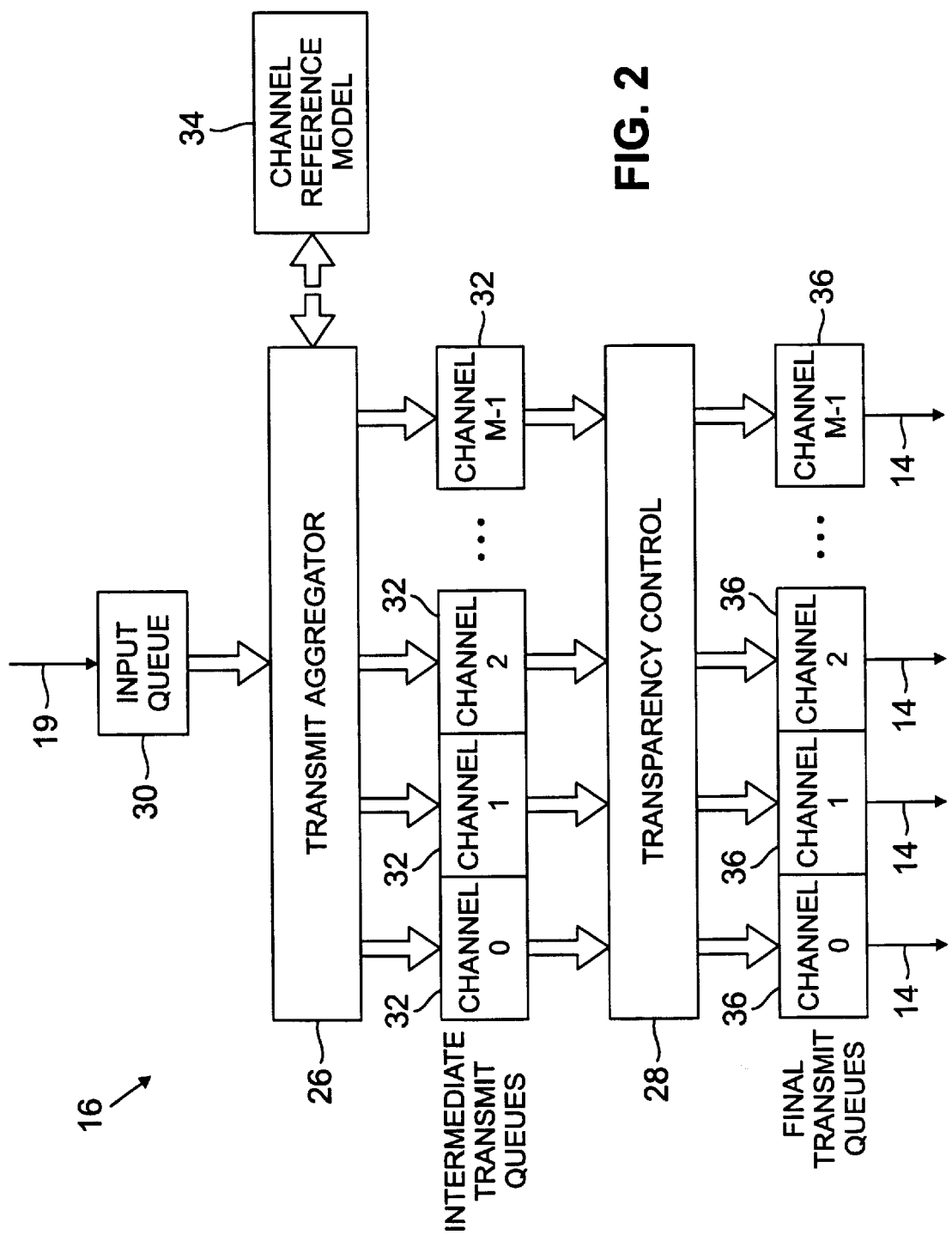

CHANNEL AGGREGATION HAVING LOW LATENCY AND OVERHEAD

CROSS REFERENCE TO RELATED US APPLICATIONS

This application claims the benefit of US provisional application No. 60/038,964, filed Feb. 24, 1997.

BACKGROUND OF THE INVENTION

The invention relates generally to data communications, and more particularly, to a channel aggregation method and apparatus featuring low latency and low overhead and applicable to channels with varying channel rates.

In the field of digital communications, it is often useful to improve the effective communications bandwidth between two entities by aggregating multiple communication channels to transmit a single data stream. For example, video teleconferencing systems which operate over "plain old telephone service" (POTS) lines require, for acceptable resolution and frame rate, data transmission rates which exceed those which can be provided by a single line. Greater data transmission rates can be achieved by using multiple POTS lines to form a single communications link. A known technique for channel aggregation is the use of a synchronous aggregation protocol. Synchronous aggregation protocols operate by fixing the pattern in which units of data are distributed to each channel. Since the pattern is fixed (for a given channel count), there is no overhead needed to assure that the transmitter and receiver can uniquely determine which units of data are to travel over which channel. Since there is no overhead, the units of distributed data may be arbitrarily small, resulting in little latency added by the protocol. As a result, synchronous protocols can simultaneously achieve both low latency and lower overhead. However, because the distribution pattern is fixed, synchronous channel aggregation protocols cannot operate on channels of arbitrary, differing, or time varying bit-rate. They cannot, for example, reliably operate over POTS lines, since each POTS line will have an unpredictable quality, resulting in unpredictable transmission rates on any given line. An alternative known technique for channel aggregation is the use of a packet oriented channel aggregation protocol. In a packet oriented channel aggregation protocol, data is divided into fixed or variable length packets and each packet is transmitted on one of the channels over which the aggregation is being performed. The transmitter typically chooses to send a packet on the channel whose transmit queue is least full—allowing it to distribute packets proportionally on all channels regardless of their rate. With each packet, the transmitter must include a header to delineate packet boundaries and identify the original order of the packets so that the receiver can reconstruct the original data stream. The overhead of a packet oriented channel aggregation protocol is inversely proportional to the size of the packets—the smaller the packet, the larger the percentage of the packet size that consists of header or overhead information. The latency of transmission, however, is proportional to the size of the packets—the larger the packet, the greater the latency introduced by the channel aggregation protocol. This results in a trade-off between latency and overhead in known packet based channel aggregation protocols.

It is an object of the invention to achieve a channel aggregation protocol which can operate over an arbitrary and varying number of channels of arbitrary, differing, and time-varying bit rates, but which simultaneously exhibits low overhead and low latency. Another object of the invention is to achieve this result in a protocol of low implementation complexity. Another object of the invention is to achieve this result over channels which are unidirectional or bi-directional.

SUMMARY OF THE INVENTION

The present invention provides a method and system for aggregating an arbitrary and time-varying number of multiple channels of arbitrary, differing, and time-varying bit-rates, to communicate a single stream of data between a transmitter and a receiver. The invention features a transmitter and a receiver, both of which include a finite state machine for deterministicly producing a progression of channel indicators. Data samples from an input stream are transmitted over individual channels according to the output of the finite state machine, and data samples are read from the individual channels and processed by the receiver to recreate the data samples of the input stream in the same order. The invention features a method for re-synchronizing the finite state machines in the transmitter and the receiver at any time, and in particular after any change in the number of channels, or their data transmission rates. The invention also features a method for error detection.

In general, in one aspect, the invention features, in a data transmission system having a plurality of data transmission channels, a transmitter and a receiver, a method for transmitting data samples comprising including transmitting at the transmitter a first set of initialization data over a first set of data transmission channels, receiving at the receiver, from the first set of data transmission channels, the first set of initialization data, initializing a first finite state machine in the transmitter using the first set of initialization data, initializing a second finite state machine in the receiver using the first set of initialization data, repeatedly using the first finite state machine to generate a first channel identifier, selecting a selected transmission channel from the first set of data transmission channels according to the value of the channel identifier, and transmitting, from the transmitter to the receiver, a data sample over the selected data transmission channel and repeatedly using the second finite state machine to generate a channel identifier, selecting a selected data transmission channel from the first set of data transmission channels according to the value of the channel identifier, and reading, at the receiver, a data sample from the selected data transmission channel.

Preferred embodiments may include one or more of the following features. The set of initialization data includes, for each channel in the first set of data transmission channels, a channel proportion value, proportional to the relative throughput rate of the channel. Using the finite state machine to generate a channel identifier includes incrementing a state variable associated with each of the first set of data transmission channels by the channel proportion value associated with the channel, identifying the data transmission channel having the largest associated state variable, generating the channel identifier associated with the identified data transmission channel, and decrementing the state variable associated with the identified data transmission channel by an amount equal to the total of channel proportion parameters for each of the first set of data transmission channels. Transmitting initialization data over the set of data transmission channels includes transmitting a header set which includes at least one header block transmitted over each of the first set of data transmission channels, and for each channel the header block includes a channel proportion parameter proportional to the relative throughput of the channel. Transmitting initialization data over the set of data transmission channels includes transmitting a header set which includes at least one header block transmitted over each of the first set of data transmission channels, and for each channel the header block includes a header flag, a sequence number common to all of the header blocks in the header set, a channel tag identifying the channel, and information specifying whether the channel tag is the largest of the channel tags identifying channels in the first selected set of data transmission channels. After performing the steps outlined above, transmitting a second set of initialization data over a second set of data transmission channels, receiving at the receiver, from the second set of data transmission channels, the second set of initialization data, initializing the first finite state machine using the second set of initialization data and initializing the second finite state machine using the second set of initialization data. Transmitting a data sample from the transmitter to the receiver includes, in the transmitter, using a transparency control method to temporarily remove instances of header flags from the data sample, and reading a data sample at the receiver includes using a transparency control method to restore the instances of header flags temporarily removed from the data sample.

In general, in another aspect, the invention features a method for transmitting a stream of data including repeatedly transmitting sequential samples of data from the stream of data over a first plurality of communication channels from a transmitter to a receiver according to a synchronous aggregation protocol, transmitting over a second plurality of communication channels from the transmitter to the receiver, parametric information for modifying the synchronous aggregation protocol, resetting the transmitter and the receiver to operate according to the synchronous aggregation protocol as modified by the parametric information.

Preferred embodiments of the invention may include one or more of the following features. The parametric information modifies the synchronous aggregation protocol by changing the relative rate at which data is transmitted over at least one data communication channel. The parametric information modifies the synchronous aggregation protocol by changing the channels over which data is transmitted. The channels over which data is transmitted are changed to be the channels in the second plurality of communication channels. The throughput of the communication channels in the first plurality of communication channels is repeatedly monitored, and the parametric information transmitted over the second plurality of communication channels reflects a change in the throughput of at least one communication channel. The availability of a set of potentially available communication channels between the transmitter and the receiver is repeatedly monitored, and the parametric information transmitted over the second plurality of communication channels reflects a change in the availability of at least one communication channel. The data samples are transmitted using a transparency control technique to distinguish them from transmitted parametric information.

In general, in another aspect, the invention features, in a communication system having a plurality of data transmission channels, a transmitter and a receiver, a mechanism for transmitting data samples including a mechanism for transmitting at the transmitter a first set of initialization data over a first set of data transmission channels, a mechanism for receiving at the receiver, from the first set of data transmission channels, the first set of initialization data, a mechanism for initializing a first finite state machine in the transmitter using the first set of initialization data, a mechanism for initializing a second finite state machine in the receiver using the first set of initialization data, a mechanism for repeatedly using the first finite state machine to generate a first channel identifier, selecting a selected transmission channel from the first set of data transmission channels according to the value of the channel identifier, and transmitting, from the transmitter to the receiver, a data sample over the selected data transmission channel, and a mechanism for repeatedly using the second finite state machine to generate a channel identifier, selecting a selected data transmission channel from the first set of data transmission channels according to the value of the channel identifier, and reading, at the receiver, a data sample from the selected data transmission channel.

In general, in another aspect, the invention features a system for transmitting a stream of data including a mechanism for repeatedly transmitting sequential samples of data from the stream of data over a first plurality of communication channels from a transmitter to a receiver according to a synchronous aggregation protocol, a mechanism for transmitting over a second plurality of communication channels from the transmitter to the receiver, parametric information for modifying the synchronous aggregation protocol, a mechanism for resetting the transmitter and the receiver to operate according to the synchronous aggregation protocol as modified by the parametric information.

In general, in another aspect, the invention features a software product, residing on a machine readable medium, for controlling a data transmission system having a plurality of data transmission channels, a transmitter and a receiver, including instructions for causing the system to transmit at the transmitter a first set of initialization data over a first set of data transmission channels, receive at the receiver, from the first set of data transmission channels, the first set of initialization data, initialize a first finite state machine in the transmitter using the first set of initialization data, initialize a second finite state machine in the receiver using the first set of initialization data, repeatedly use the first finite state machine to generate a first channel identifier, select a selected transmission channel from the first set of data transmission channels according to the value of the channel identifier and transmit, from the transmitter to the receiver, a data sample over the selected data transmission channel, and repeatedly use the second finite state machine to generate a channel identifier, select a selected data transmission channel from the first set of data transmission channels according to the value of the channel identifier; and read, at the receiver, a data sample from the selected data transmission channel.

In general, in another aspect, the invention features a software product residing on a machine readable medium, for controlling a data transmission system, including instructions for causing the system to repeatedly transmit sequential samples of data from the stream of data over a first plurality of communication channels from a transmitter to a receiver according to a synchronous aggregation protocol, transmit over a second plurality of communication channels from the transmitter to the receiver, parametric information for modifying the synchronous aggregation protocol, and reset the transmitter and the receiver to operate according to the synchronous aggregation protocol as modified by the parametric information.

Other features of the invention will become apparent from the following description of preferred embodiments, including drawings, and from the claims.

BRIEF DESCRIPTION OF THE DRAWINGS

FIG. 2 is a schematic diagram of the transmitter of the invention.

DESCRIPTION OF THE PREFERRED EMBODIMENTS

Figure 1:
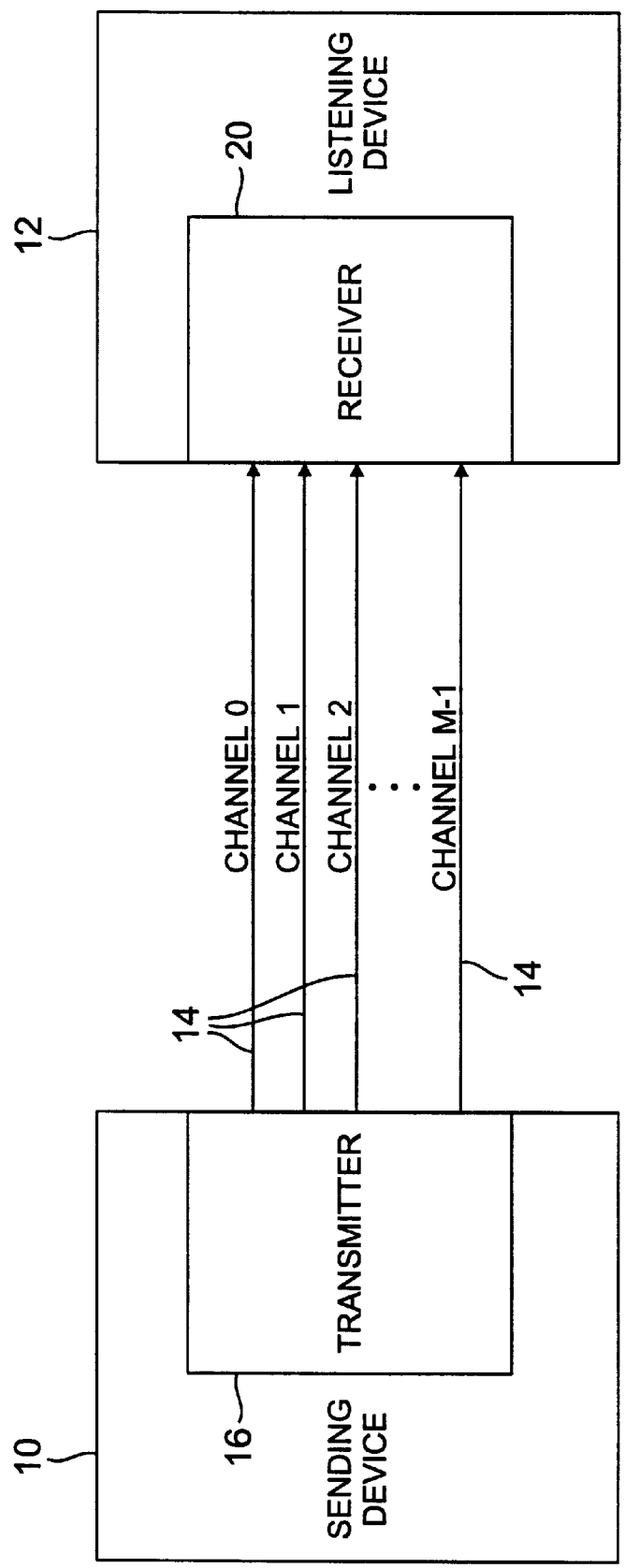
FIG. 1 is a schematic diagram of a sending device communicating with a listening device over M channels.
Figure 1A:
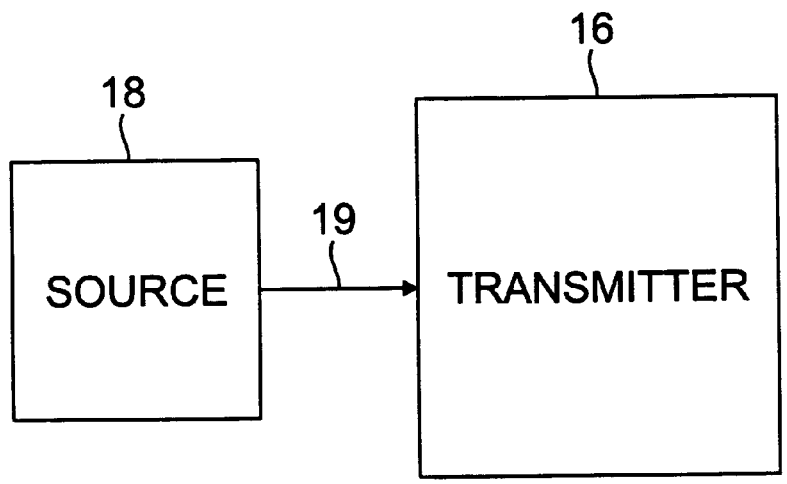
FIG. 1a is a schematic diagram of a transmitter receiving a stream of data from a source over a single channel.
Figure 1B:
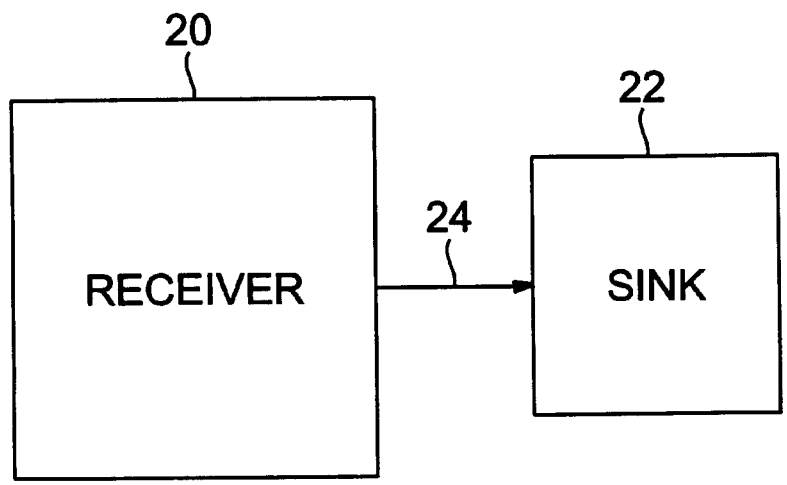
FIG. 1b is a schematic diagram of a receiver sending a stream of data to a sink over a single channel.

Referring to FIG. 1, a sending device 10 and a listening device 12 are connected by M communication channels 14, where M is a positive integer. Each communication channel 14 is a single unidirectional data stream over which data is transmitted. The interface between the sending device and each of the communication channels is a transmitter 16. The transmitter can be implemented in hardware or software. Referring to FIG. 1a, a source 18 of data transmitted by the transmitter can be any process which would normally transmit data over a single data channel 19. This source 18 of data may be within or outside the sending device 10. Referring again to FIG. 1, the interface between the listening device 12 and each of the communication channels 14 is a receiver 20, which can also be implemented in hardware or software. Referring to FIG. 1b, a sink 22 of data received by the receiver 20 can be any process which would normally receive data over a single data channel 24. This sink 22 of data may be within or outside the listening device 12.

Referring to FIG. 2, the transmitter 16 performs the method of the invention. As in FIG. 1, the transmitter 16 of this example is connected to M communication channels 14. The transmitter 16 has two autonomous processes, a transmit aggregator 26 and a transparency control process 28. The input to the transmit aggregator is read from an input queue 30 receiving a continuous stream of bits 19 which are to be transmitted to the listening device. The transmit aggregator 26 is capable of writing output to any one of M "intermediate transmit queues" 32. The operation of the transmit aggregator 26 is controlled by a finite state machine 34 referred to as the "channel reference model." The operation of the transmit aggregator 26 and the channel reference model 34 will be described in more detail below.

The second process operating in the transmitter is the "transparency control" process 28. This process is capable of reading input from each of the M intermediate transmit queues 32 and writing output to each of M "final transmit queues" 36. Each final transmit queue 36 is uniquely associated with one of the M communication channels 14, and data written to each final transmit queue 36 are transmitted over its corresponding channel 14. The operation of the transparency control process 28 will be described in more detail below.

Figure 3:
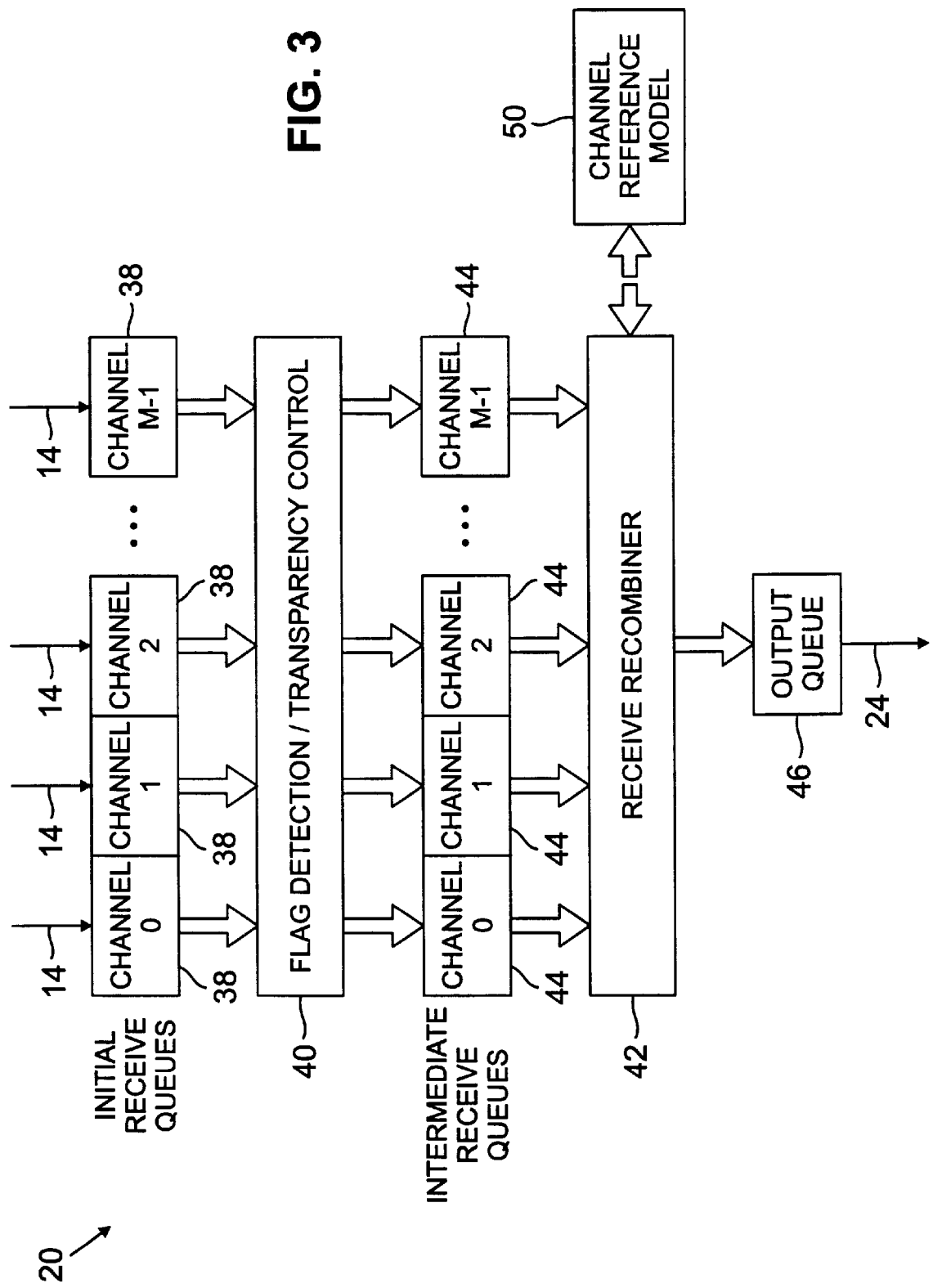
FIG. 3 is a schematic diagram of the receiver of the invention.

Referring to FIG. 3, the receiver 20 performs the method of the invention. As with the transmitter 16 of FIG. 2, the receiver 20, in this example, is connected to the M communication channels 14. Data arriving from each communication channel 14 are placed on an "initial receive queue" 38 uniquely associated with that channel.

Two autonomous processes operate within the receiver. A "FLAG detection/transparency control" process 40, and a "receive recombiner" process 42. The FLAG detection/transparency control process 40 is capable of reading from any one of the M initial receive queues 38. It is capable of writing to any one of M "intermediate receive queues" 44. The operation of the FLAG detection/transparency control process 40 will be described in more detail below.

The receive recombiner process 42 is capable of reading input from any one of the intermediate receive queues 44, and writing its output to an output queue 46, which is the final output of the receiver. The output queue produces a continuous stream of bits over channel 24 identical to the input stream of the transmitter. Like the transmit aggregator process of the transmitter, the operation of the receive recombiner process 42 is controlled by the output of a channel reference model 50. This channel reference model is implemented as a finite state machine which operates in an identical fashion to the channel reference model 34 referred to in the description of the transmitter. The operation of the receive recombiner process 42 and the channel reference model 50 will be described in more detail below.

Figure 4:
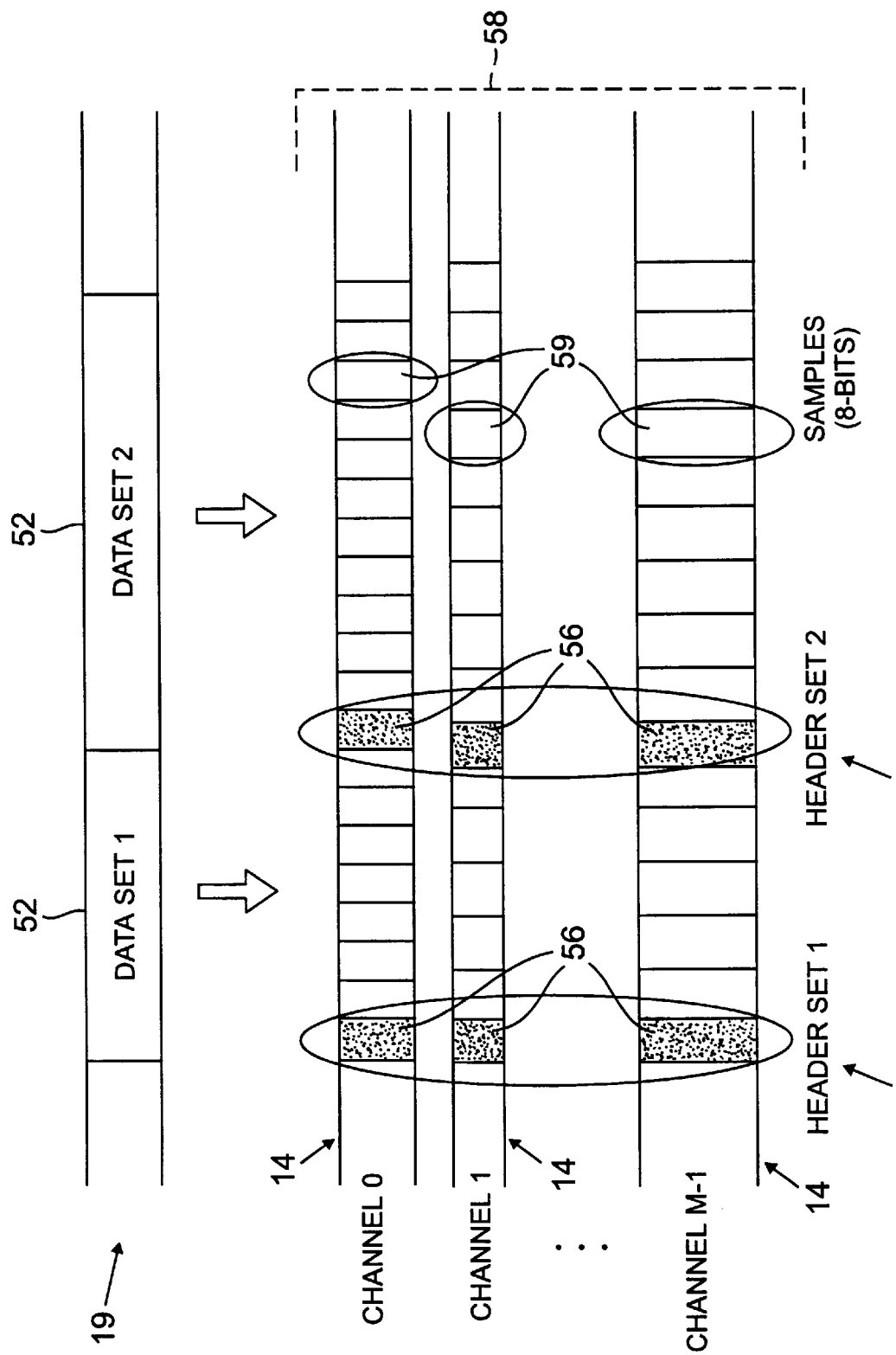
FIG. 4 illustrates the overall pattern of data transmission over M channels according to the invention.

Referring to FIG. 4, the basic pattern of data transmission, according to the invention, between a sending device and a listening device connected by M channels 14, shows the transmitted data broken down into a series of "data sets" 52 which can be of arbitrary length. As will be described in more detail below, each data set 52 consists of a continuous stream of data to be transmitted from the input queue of the transmitter to the output queue of the receiver. The data sets 52 together form the continuous data input stream over input channel 19 to the transmitter. During the transmission of a given data set, the transmitter and receiver apply a fixed, deterministic rule for allocating transmission data to each of the communication channels. This requires that during the transmission of a single data set, the number channels in use and proportion of the data set sent to each channel remain constant. The set of channels currently in use is referred to as the current "channel set."

At the beginning of the transmission of a given data set, the transmitter transmits a "header set" 54, consisting of one "header" 56 transmitted over each of the M communication channels 14 in the channel set 58. As will be explained in more detail below, each header set contains sufficient information for the receiver to determine the pattern by which the transmitter will allocate data to each of the communication channels during transmission of the ensuing data set.

On each channel 14, the transmission of the header 56 for that channel is followed by the transmission of a series of samples 59, each sample transmission consisting of a sequence of bits of uniform length, and associated with the same data set. In a preferred embodiment, the sample size is eight bits. At the beginning of the transmission of each new data set 52, a new header set 54 is transmitted. The resulting headers 56 transmitted on each of the communication channels 14 demarcate the boundaries between data of successive data sets on that channel.

Figure 5A:
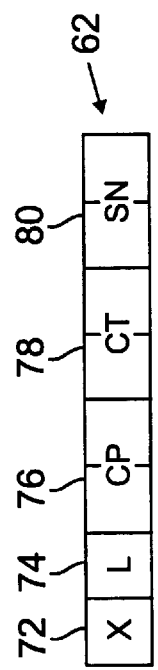
FIG. 5a shows the structure of a header control element according to the invention.
Figure 5:
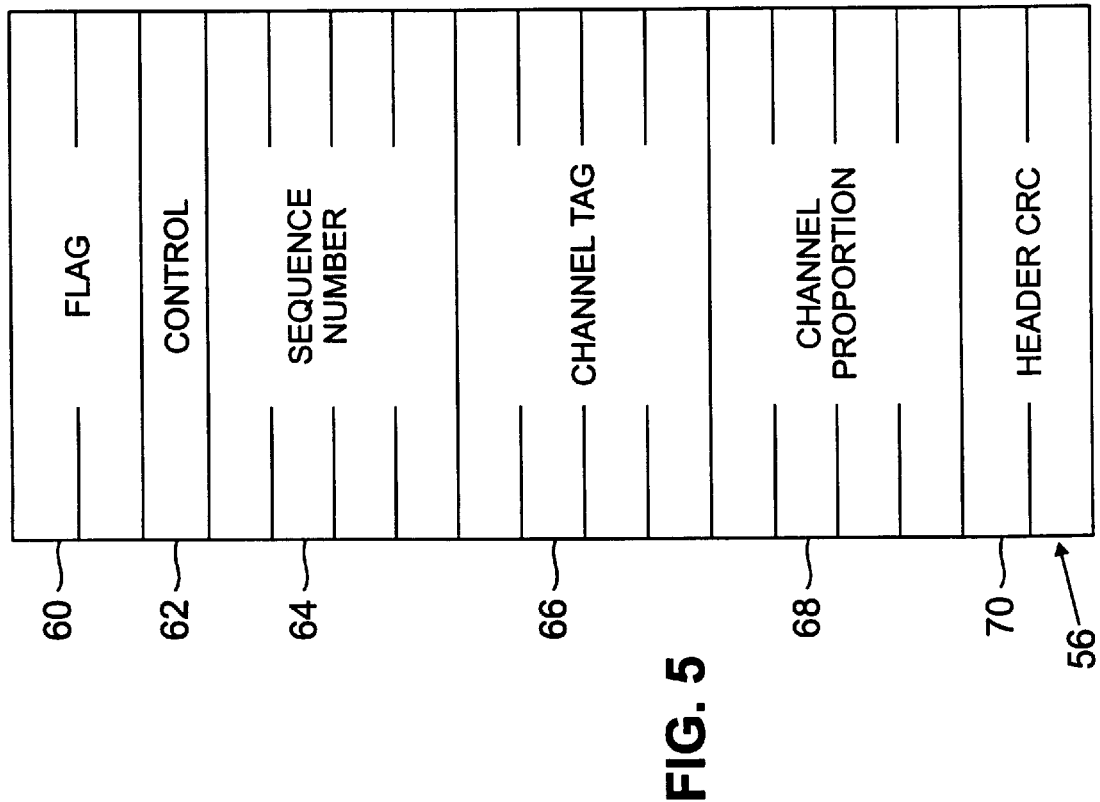
FIG. 5 shows the structure of a header according to the invention.

Referring to FIG. 5, a header consists of up to 6 elements: a FLAG element 60, a control element 62, a sequence number 64, a channel tag 66, a channel proportion 68, and a header CRC 70.

The FLAG element 60, in the illustrated embodiment, is a 16 bit constant equal to the binary number "0111111111111110". (Other values may be used.) The FLAG element identifies the beginning of a header and is unique on the channel.

The control element 62, in the illustrated embodiment, consists of five fields, as illustrated in FIG. 5a, a one bit "X" field 72 in the most significant bit, followed by a one bit "L" field 74, a two bit "CP" field 76, a two bit "CT" field 78, and a two bit "SN" field 80 in the least significant bits. The values contained in these fields will be described in more detail below.

Referring again to FIG. 5, the sequence number element 64 of the header 56 is set to contain the current value of the static register SEQUENCE_NUMBER. As will be explained in more detail below, the value of SEQUENCE_NUMBER is incremented each time a new header set is generated, thus providing all headers in a header set with a common identifying parameter. Depending on the size of the SEQUENCE_NUMBER register, the length of the sequence number header element can be one, two, or four 8-bit words. (Other lengths can also be employed.) The length of the header's sequence number element 64 is specified by the SN field 80 of the header's control element 62: a binary SN value of "01" indicates a sequence number element of one word, a value of "10" indicates two words, and a value of "11" indicates four words.

The channel tag element 66 of the header 56 is set to contain the channel tag of the channel over which a particular header will be transmitted. The channel tag is a number which uniquely identifies a particular channel in the channel set. In the illustrated embodiment, a channel set with M elements has channel tags which range from zero to M−1. The length of the header's channel tag element 66 can be zero, one, two, or four 8-bit words, depending on the magnitude of the channel indicator for the particular channel. (Other lengths can also be employed.) The length of the header's channel tag element 66 is specified by the value of the CT field 78 in the control element 62, with a value of "01" corresponding to one word, "10" corresponding to two words and "11" corresponding to four words. If there is only one channel in the channel set, the value of the CT field 78 in the control element 62 is set to "00" and the channel tag element 66 is omitted from the header, but is implicitly equal to zero.

The channel proportion element 68 of the header 56 is set to contain the channel proportion associated with the channel over which the header will be transmitted. Depending on the magnitude of the channel proportion associated with the channel, this element can consist of zero, one, two, or four 8-bit words. (Other lengths can also be employed.) The length of the channel proportion element 68 of the header 56 is specified by the value of the CP 76 field in the control element 62, with a value of "01" corresponding to one word, "10" corresponding to two words and "11" corresponding to four words. If there is only one channel in the channel set, the value of the CP field is set to "00" and the channel proportion element 68 is omitted from the header 56, but is implicitly equal to one.

Referring again to FIG. 5a, the value of the L field 74 of the control element 62 is set to "1" if the particular header has the highest channel tag value of any header in the header set. Otherwise this field is set to "0". The value of the X field 72 of the control element 62 is unused, in this illustrated embodiment, and is always set to zero.

Referring again to FIG. 5, a header CRC element 70 is set to a 16 bit cyclic redundancy check value based on the other elements in the header. In the present embodiment, this value is determined according to the method for determining the 16-bit Frame Check Sequence detailed in the document entitled "Information Technology—Telecommunications and Information Exchange Between Systems—High-Level Data Link Control (HDLC) Procedures—Frame Structure" which is published by the International Standards Organization as document ISO/IEC 3309. However, this value can be determined by any known method for computing cyclic redundancy check values.

Figure 6:
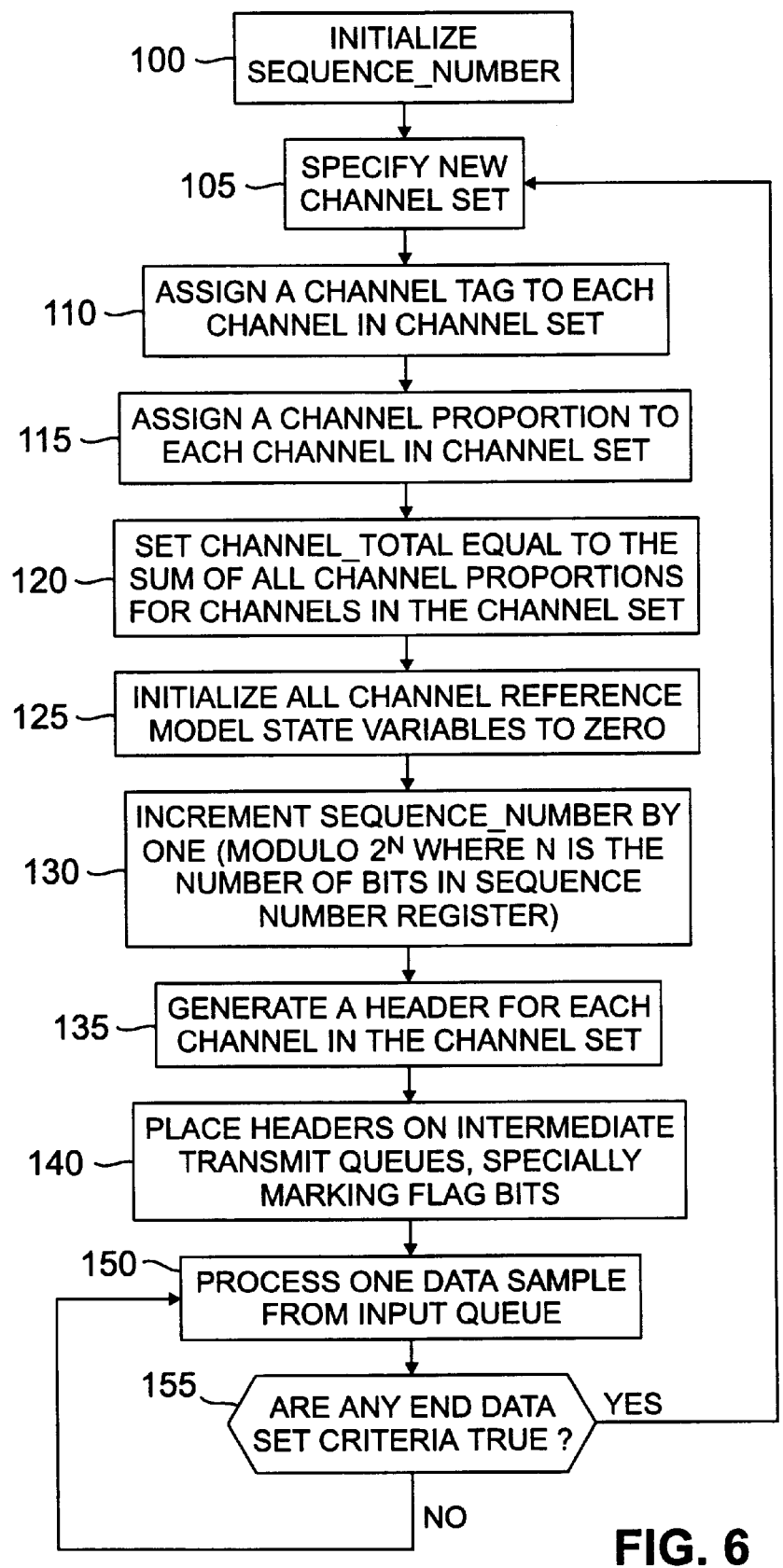
FIG. 6 is a flow chart of the transmit aggregator process according to the invention.

FIG. 6 is a flow chart showing the overall operation of the transmitter. First, a register SEQUENCE_NUMBER, containing an unsigned integer variable, is initialized (step 100). The value of SEQUENCE_NUMBER is used to identify, with a common number, all headers in a header set. In one embodiment, the initialization value is zero, however any initialization value will suffice.

The size N of the SEQUENCE_NUMBER register, in bits, can vary in different embodiments. It is necessary that N be large enough so that the difference between the maximum and the minimum number of headers that could be simultaneously in transit over any channel is less than 2 to the Nth power. Because the size of the register SEQUENCE_NUMBER is fixed, it is only capable of providing a finite number of possible values by which to identify header sets. The specified constraint ensures that all headers simultaneously in transit over all channel will be identified by the same value only if they belong to the same header set, even if SEQUENCE_NUMBER values are eventually repeated (as they typically will be). An estimate of the possible number of headers in transit must account then, in the illustrated embodiment, for the maximum end-to-end skew between channels, the maximum allowed skew between transmit buffers for each channel, and the range of temporal spacing allowed between header sets.

In step 105, a "channel set" is specified. The channel set consists of all of the communication channels which are currently being used by the transmitter (typically this includes all channels currently available for use). Each channel in the channel set is assigned a "channel tag", a unique numerical identifier in the range 0 to M−1, where M is the number of channels in the channel set (step 110).

In step 115, each channel in the channel set is assigned a "channel proportion." The value of the channel proportion is an unsigned integer which is proportional to the rate at which data will be transmitted to that channel during transmission of the data set. In a preferred embodiment, the channel proportion is a fraction of the expected throughput of the channel in bits per second.

In step 120, the sum of the channel proportions for all of the channels in the channel set is determined and stored in the variable CHANNEL_TOTAL.

In step 125, the state variables of the channel reference model are initialized to zero. The channel reference model has one state variable corresponding to each of the channels in the channel set. Each state variable is a signed integer.

In step 130, the value of the SEQUENCE_NUMBER register is incremented by one, modulo 2 to the Nth power, where N is the number of bits in register.

In step 135, a header set is generated by generating one header for each of the channels in the channel set. The header generated for each communication channel is placed on the intermediate transmit queues for the respective channel (step 140).

Any bits which are part of a FLAG element are specially marked on the intermediate transmit queue so that they can be recognized as FLAG element bits when read from the intermediate transmit queue. This requirement can be accomplished, for example, by making each entry of the intermediate transmit queue two bits wide, where the first bit is the queued data, and the second bit is set to "1" when the corresponding queued data is part of a FLAG element.

In step 150, after the header for each channel has been created and placed in the appropriate intermediate transmit queue, the transmit aggregator processes a sample of data from the input queue (step 150). This process is explained in more detail below.

In step 155, a set of locally defined "end data set criteria" are checked to determine whether a new data set should be started. In a preferred embodiment, the end data set criteria will include at least a) the passage of some fixed amount of time since the beginning of the data set, b) a change in the number of available channels, and c) the detection of a skew between any two final transmit queues which exceeds a specified threshold.

(The skew between two queues is defined as the difference between the values of the estimated amount of time that data spends in the respective queue. The amount of time in a transmit queue is estimated, based on the fullness of the queue and the estimated rate of the associated channel. Suppose, for example, that a first queue has 5 entries, and it is known that the associated channel transmits data at approximately one bit per 1/1000 second. Suppose also that a second queue has 15 entries, and the associated channel transmits data at approximately one bit per 1/10,000 second. The estimated time that a bit will spend in the first queue is 5/1000 or 1/200 second, while the estimated time that a bit will spend in the second queue is 15/10,000 or 3/2000 second. The skew is therefore 1/200−3/2000 or 7/2000 second.)

If none of the end data set criteria are true, step 150 is repeated, and more data is processed by the transmit aggregator process. If any of the criteria are true, the data set is terminated by returning to step 105, which begins the process of starting a new data set.

Figure 7:
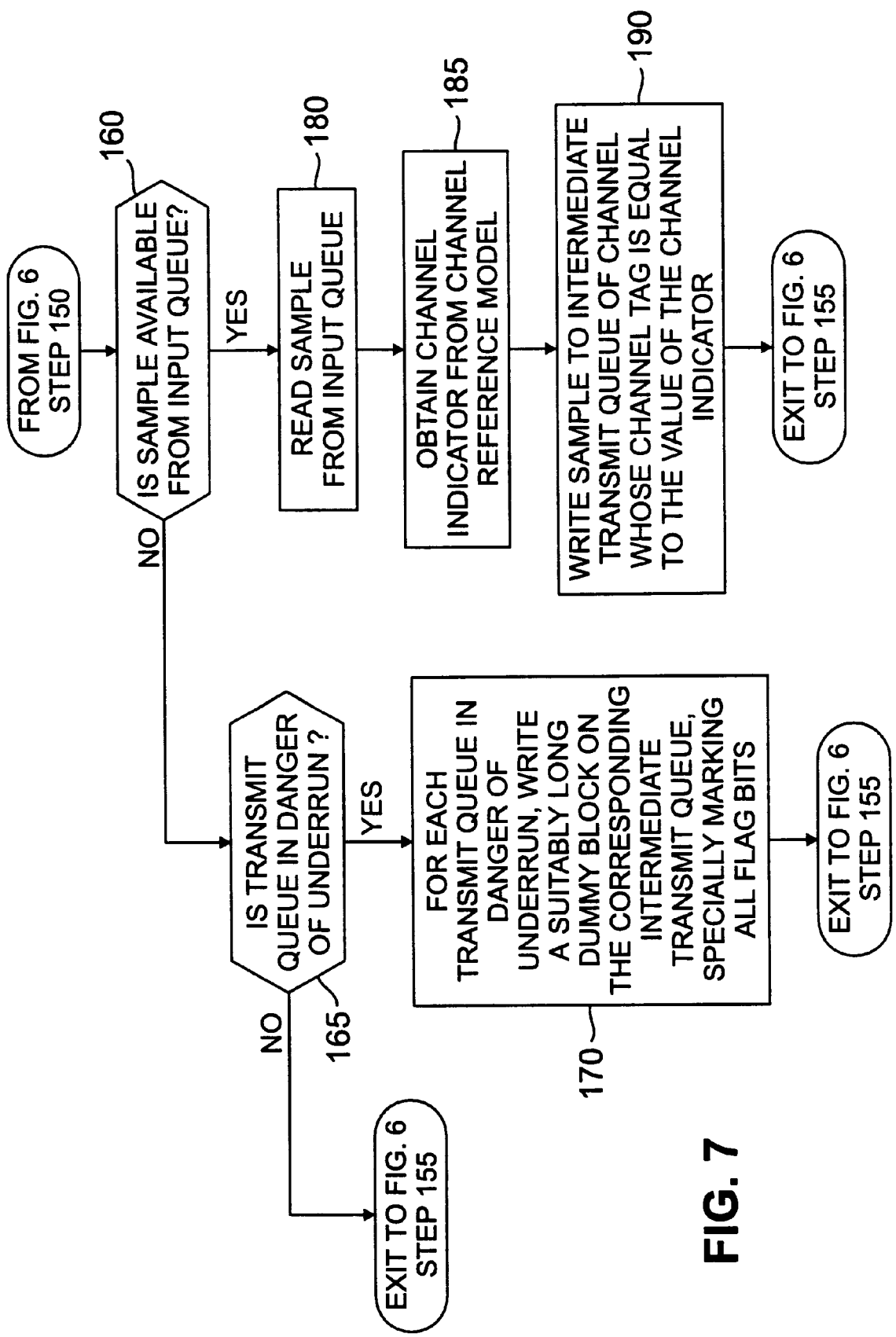
FIG. 7 is a flow chart of the process by which the transmit aggregator process processes one sample of data according to the invention.

FIG. 7 is a flow chart showing the steps executed by the transmit aggregator process in processing a single sample of data (step 150 in FIG. 6).

In step 160, the transmit aggregator tests the input queue to determine if a sample of data is available. If a sample is not available, a test is performed (step 165) to determine if any of the final transmit queues is in danger of underrunning. The definition of "underrunning" will depend on the particular implementation but in general refers to the lack of sufficient data in a final transmit queue to transmit over a channel which requires a minimum rate of data transmission for proper operation.

Figure 7A:
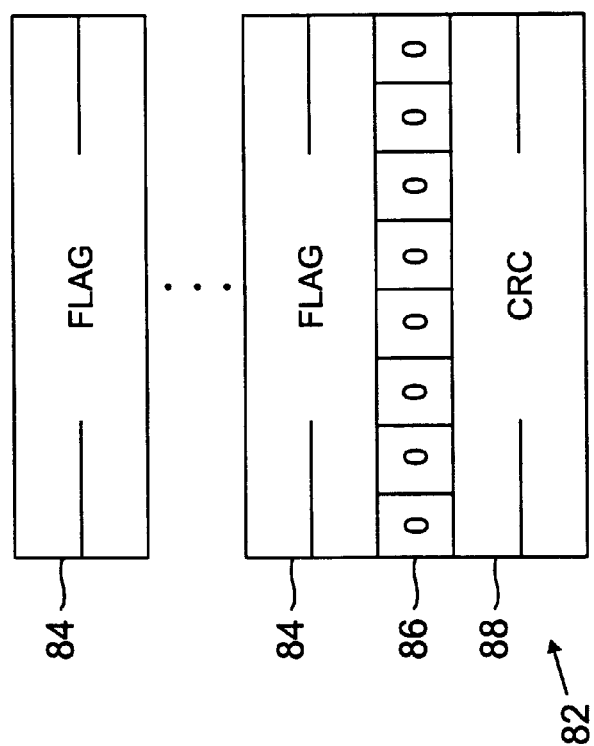
FIG. 7a shows the structure of a dummy block according to the invention.

If no final transmit queue is in danger of underrunning, control returns back to step 155 of FIG. 6. If any final transmit queue is in danger of underrunning, a "dummy block" is placed in the corresponding intermediate transmit queue, again specially marking all FLAG bits (step 170). FIG. 7a shows the structure of a dummy block 82. The dummy block begins with a series of one or more FLAGs 84, consisting of the binary string "0111111111111110". The number of FLAGs can be adjusted depending on an estimate of how much "fill" is needed to prevent the queue in question from underrunning. An element 86 containing the eight bit constant "00000000" follows the series of FLAGs. Since the two low order bits of this constant are zero, this dummy block can be distinguished from a header, which cannot have the two low-order bits of the eight-bit string following a FLAG (that is, the SN field of the control element) set to "00". The final element of the dummy block is a CRC element 88, which is a cyclic redundancy check value determined in the same way as described for the header CRC element.

After all necessary dummy blocks have been written, control returns to step 155 in FIG. 6.

If, at step 160, a sample of data is available at the input queue, that sample is read from the input queue (step 180). In step 185, a channel indicator is obtained from the channel reference model. In step 190, the sample of data is written to the intermediate transmit queue corresponding to the channel indicator returned by the channel reference model. Control then returns to step 155 in FIG. 6.

Figure 8:
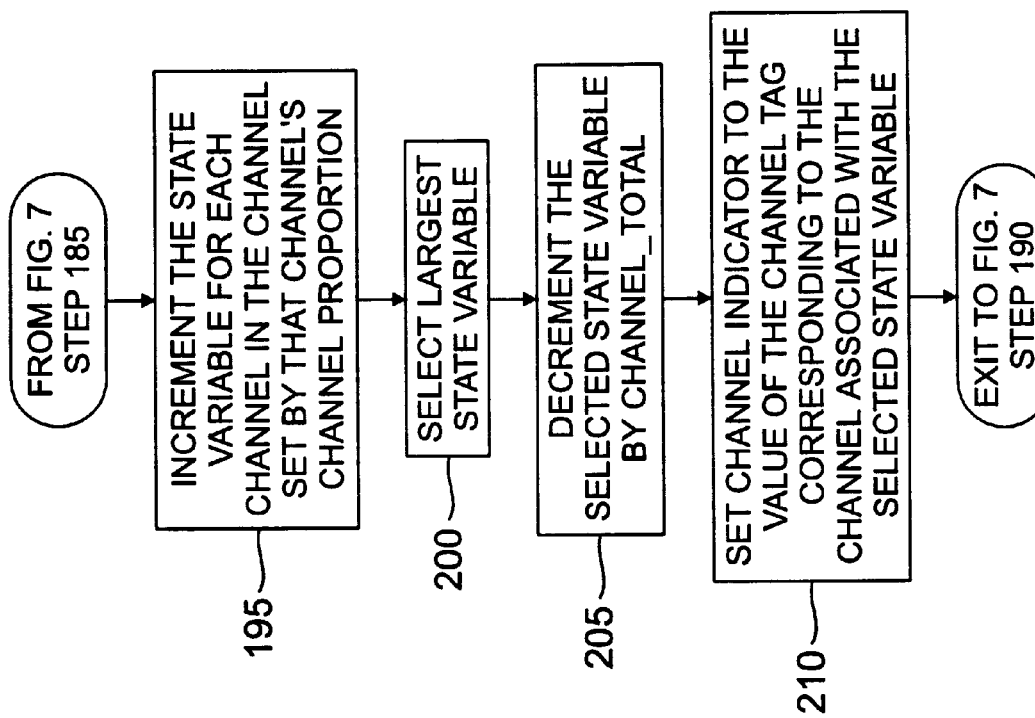
FIG. 8 is a flow chart showing the process of the channel reference model according to the invention.

Referring to FIG. 8, the channel reference model, upon receipt of a request to provide a channel indicator, as at step 185 in FIG. 7, increments the state variable associated with each channel by the value of the channel proportion associated with that channel (step 195). In step 200, the state variable with the largest value is selected. (In case of a tie, among those that are tied, the state variable corresponding to the smallest valued channel tag is selected.) In step 205, the selected state variable is decremented by the value of CHANNEL_TOTAL, the sum of all of the channel proportion values. Finally, in step 210, the channel reference model returns the channel indicator, which is set to the value of the channel tag corresponding to the channel associated with the selected state variable. In this manner, sample data is distributed to each channel in accordance with the channel proportion value.

Figure 9:
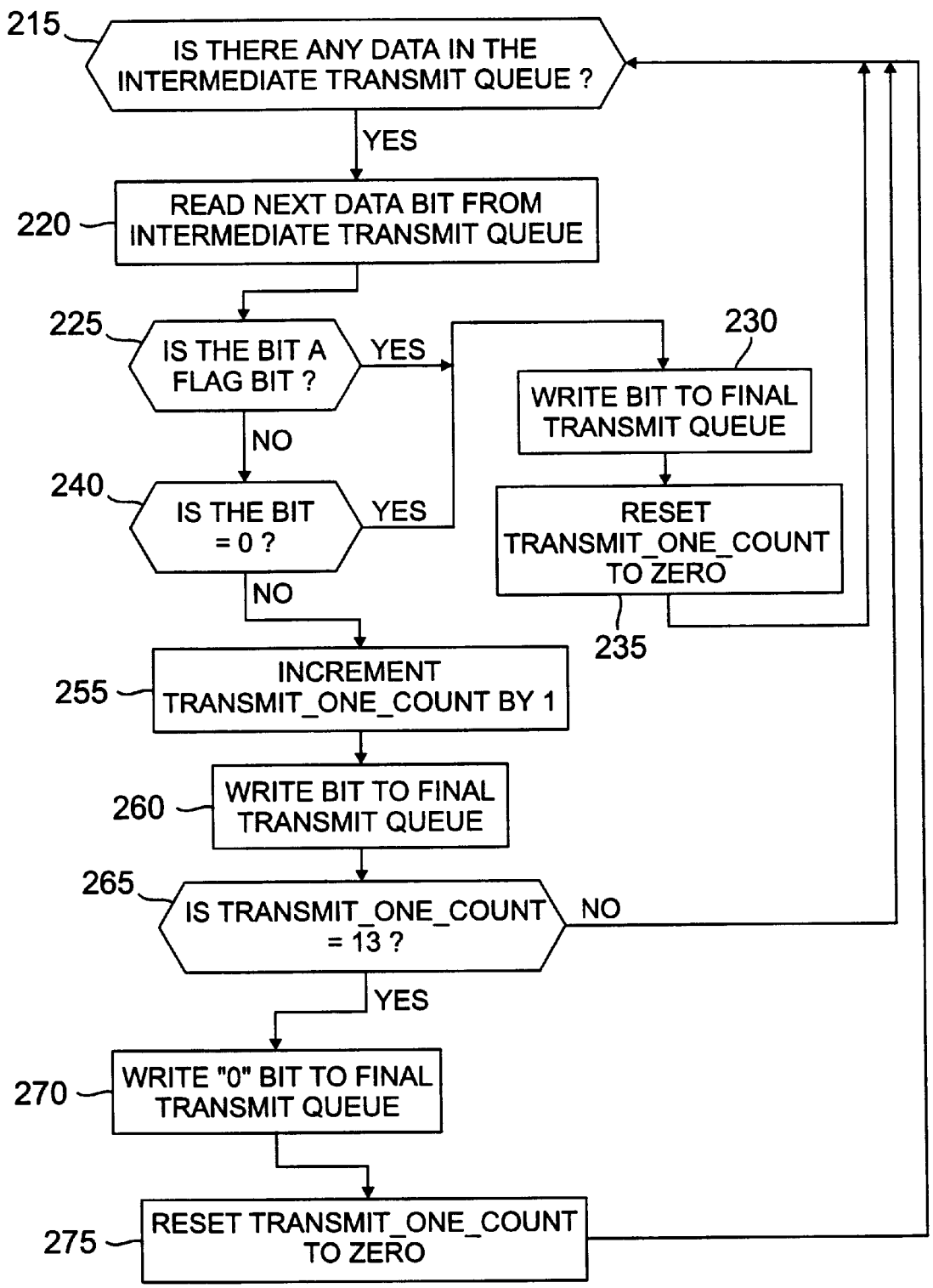
FIG. 9 is a flow chart of the transparency control process according to the invention.

The transparency control process operates to eliminate the possibility that a FLAG will appear within a sequence of data samples. According to this control process, all strings of fourteen consecutive "1" bits, in the illustrated embodiment, which are not part of a FLAG, are eliminated. FIG. 9 shows the steps executed by the transparency control process in processing data from one of the intermediate transmit queues. Depending on the implementation, this process can be repeated sequentially for each of the M intermediate transmit queues; or in a preferred embodiment, multiple instances of the process run simultaneously, processing data from multiple intermediate transmit queues in parallel.

First, the intermediate transmit queue is checked to see if a bit of data can be read (step 215). This step is repeated until a bit can be read. If a bit can be read, it is read (step 220) and then checked to see if it constitutes part of a FLAG element (step 225). If the bit does constitute part of a FLAG element, as indicated by a special marker associated with that bit in the intermediate transmit queue, it is written to the final transmit queue (step 230), and a state variable TRANSMIT_ONE_COUNT, associated with the particular channel, is reset to zero (step 235). The process then returns to step 215 to process the next bit from the intermediate transmit queue.

If the bit which has been read does not constitute part of a FLAG element, then its value is compared to "0" (step 240). If the value is "0", the bit is written to the final transmit queue (step 230), and the value of TRANSMIT_ONE_COUNT is set to zero (step 235). The process then returns to step 215 to process the next bit from the intermediate transmit queue.

If the value of the bit is not "0" (and therefore "1"), TRANSMIT_ONE_COUNT is incremented (step 255), and the bit is written to the final transmit queue (step 260). The value of TRANSMIT_ONE_COUNT is compared with "13" (step 265). If TRANSMIT_ONE_COUNT equals thirteen then an extra "0" is written to the final transmit queue (step 270), and the value of TRANSMIT_ONE_COUNT is reset to zero (step 275). The process then returns to step 215 to process the next bit from the intermediate transmit queue. In this way, a FLAG cannot appear in the data set transmission.

Figure 10:
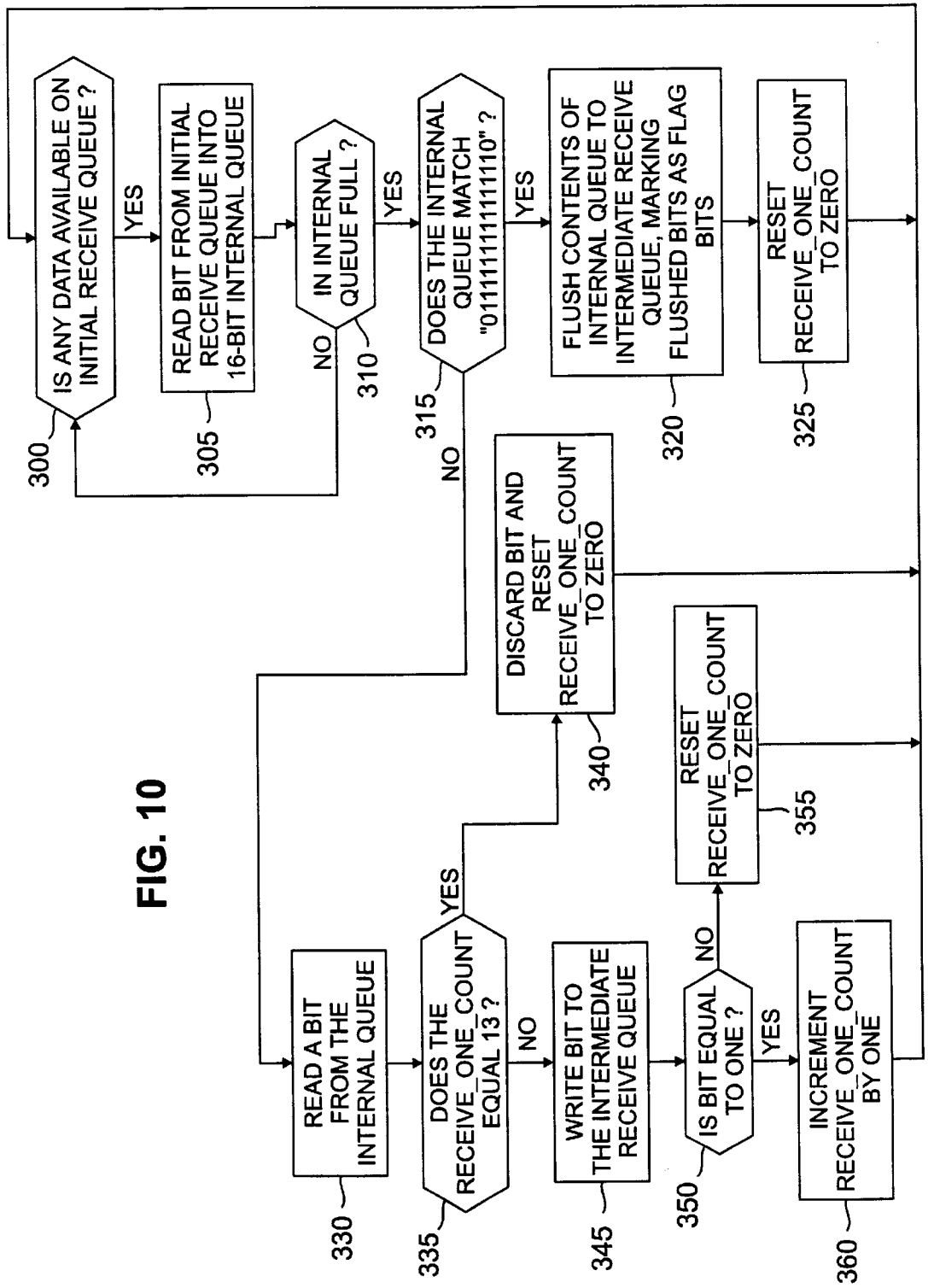
FIG. 10 is a flow chart of the FLAG detection/transparency control process according to the invention.

FIG. 10 is a flow chart showing the steps executed by the FLAG detection/transparency control process of the receiver.

As with the transparency control process in the transmitter, and depending on the implementation, this process can be repeated sequentially for each channel or, in a preferred embodiment, multiple instances of the process run simultaneously, processing data from multiple channels in parallel.

In step 300, the initial receive queue is checked to see if a bit of data can be read from the initial receive queue. This step is repeated until a bit can be read. If a bit can be read it is read, and its value placed on an internal 16-bit long queue (step 305). The internal queue is then tested to see if it is full (that is, if 16 bits have been placed on it) (step 310). If it is not full, additional bits must be read from the initial receive queue, and control returns to step 300. If the internal queue is full, its contents are compared with the FLAG string, "0111111111111110" (step 315).

If the contents of the internal queue match the FLAG string, the entire contents of the queue are flushed from the internal queue to the intermediate receive queue (that is, they are written to the intermediate receive queue and deleted from the internal queue), and each bit is specially marked on the intermediate receive queue as a FLAG bit (step 320). The variable RECEIVE_ONE_COUNT is reset to zero (step 325), and control returns to step 300.

If the contents of the internal queue do not match the FLAG string, then a single bit is read from the internal queue (step 330). The value of RECEIVE_ONE_COUNT is compared to "13" (step 335). If RECEIVE_ONE_COUNT equals "13", the bit is discarded, RECEIVE_ONE_COUNT is reset to zero (step 340), and control returns to step 300. If RECEIVE_ONE_COUNT is not equal to "13", the bit is written to the intermediate receive queue (step 345) and the value of the bit is compared to "1" (step 350). If the bit is not equal to "1", RECEIVE_ONE_COUNT is reset to zero (step 355). If the bit is equal to "1", the variable RECEIVE_ONE_COUNT is incremented by one (step 360). In either case, the control then returns to step 300.

If, at step 335, the value of the bit is equal to "1", the variable RECEIVE_ONE_COUNT is incremented by one (step 340), the bit is written to the intermediate receive queue (step 355) and control returns to step 300.

The receive recombiner operates in one of two modes, HUNT mode and NORMAL mode. When starting operation, the receive recombiner begins in HUNT mode, and the variable REC_SEQ_NUM is set to the value "unknown." All other internal variables are also set to their default values."

Figure 11:
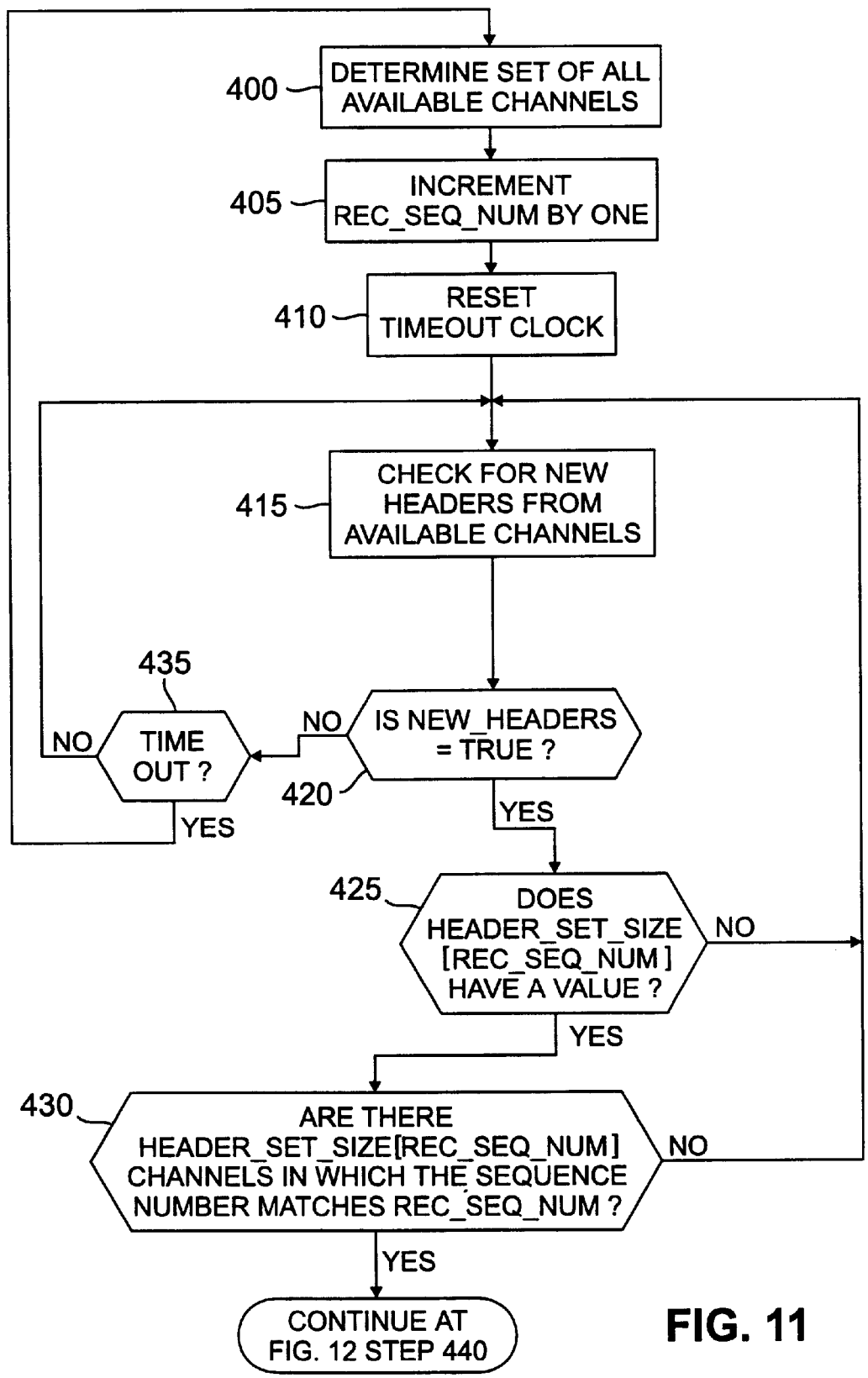
FIGS. 11, 12, 13, 14, and 15 are flow charts of the receive recombiner process in HUNT mode according to the invention.

In HUNT mode, the receive recombiner is searching for a new header set. Referring to FIG. 11, the set of currently available channels is determined (step 400). The method for determining the set of available channels will vary depending on the particular implementation. There can, for example, be special hardware flags associated with each potentially available channel, which are set to TRUE when the channel is available. Note that this set may be smaller or larger than the existing channel set, depending on whether channels have been put into service or removed from service since the last header set was transmitted or whether the existing channel set was utilizing all available channels.

Next, the variable REC_SEQ_NUM is incremented by one (step 405. This is the expected next value of the sequence number element of headers in a header set. If the REC_SEQ_NUM had the value "unknown", this value is retained instead of incrementing. A timeout clock is reset (step 410). Then the receive recombiner checks if any new headers are available for processing (step 415). This step is described in more detail below.

The result of the check for new headers is found in the variable NEW_HEADERS. This value is tested (step 420) and if it is FALSE, a time out test is performed (step 435). This test will be implementation dependent, but will detect unacceptably long delays in detecting the remaining headers of a given header set. If there has been a time out, the current header set is discarded, REC_SEQ_NUM is set to "unknown", and control returns to step 400; and the process of finding a new header set begins anew. If there has not been a time out, control returns to step 415 and the search for a new header in the current header set continues.

If NEW_HEADERS is TRUE, a new header has been found. In this case, the variable HEADER_SET_SIZE[REC_SEQ_NUM] is tested to see if it has a value. This variable contains the size of the header set with sequence number REC_SEQ_NUM. If it does not have a value, or if REC_SEQ_NUM is set to "unknown", then control returns to step 415. If it does have a value, then the value HEADER_SET_SIZE[REC_SEQ_NUM] is compared to the number of headers which have been received with sequence numbers equal to REC_SEQ_NUM. If these values are not equal, then not all of the headers in the current header set have been received, and control returns to step 415.

Figure 12:
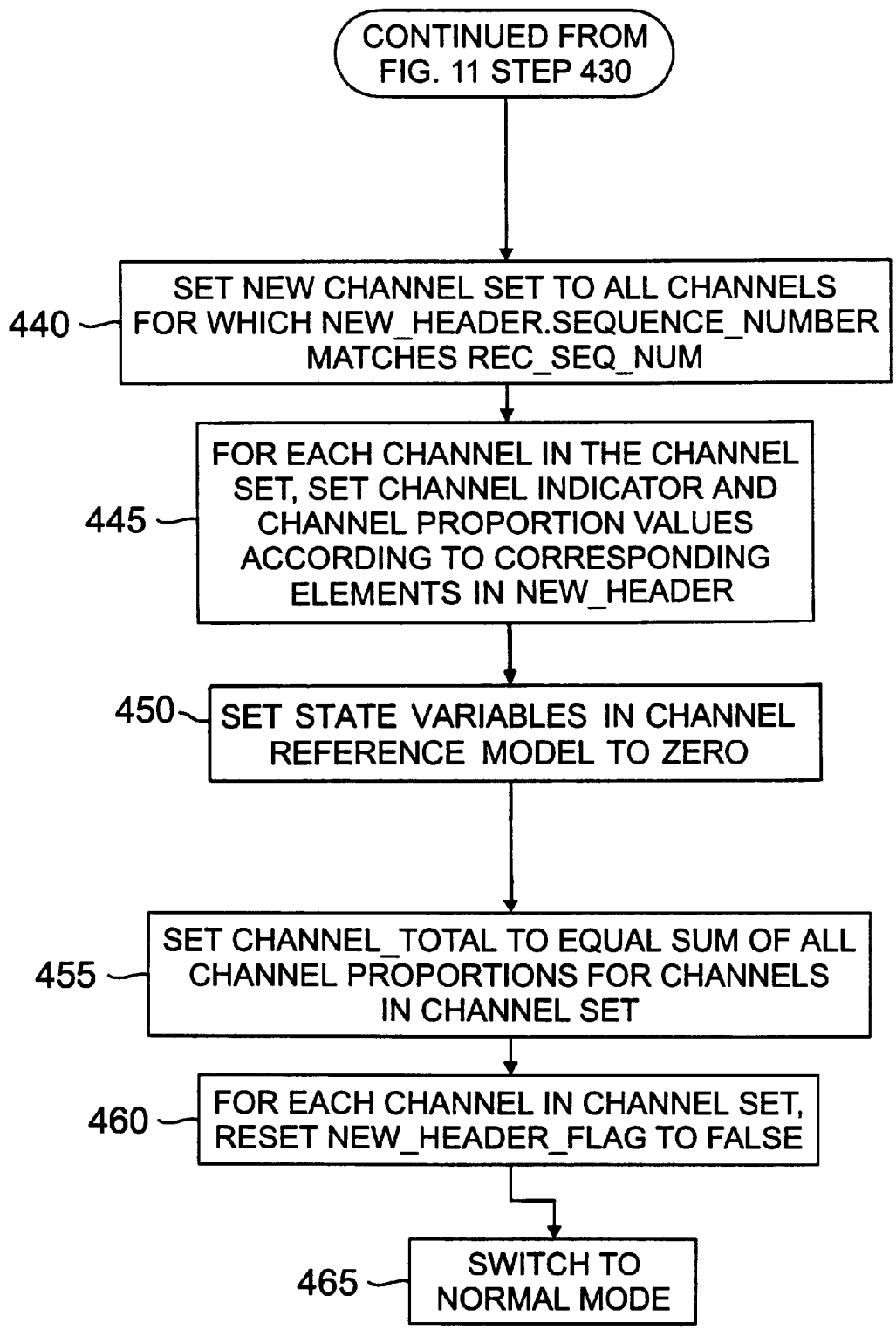

If the values are equal then an entire header set has been received. In this case, and referring to FIG. 12, a new channel set is established, consisting of all channels on which a header received on that channel had a sequence number equal to REC_SEQ_NUM (step 440). Then channel indicators and channel proportions for each channel are read from the headers (step 445). The state variables for the receiver's channel reference model are reset to zero (step 450). The variable CHANNEL_TOTAL is set to the sum of all of the channel proportions (step 455). The variable NEW_HEADER_FLAG associated with each channel is set to FALSE (step 460). The receive recombiner then switches to NORMAL mode.

Figure 13:
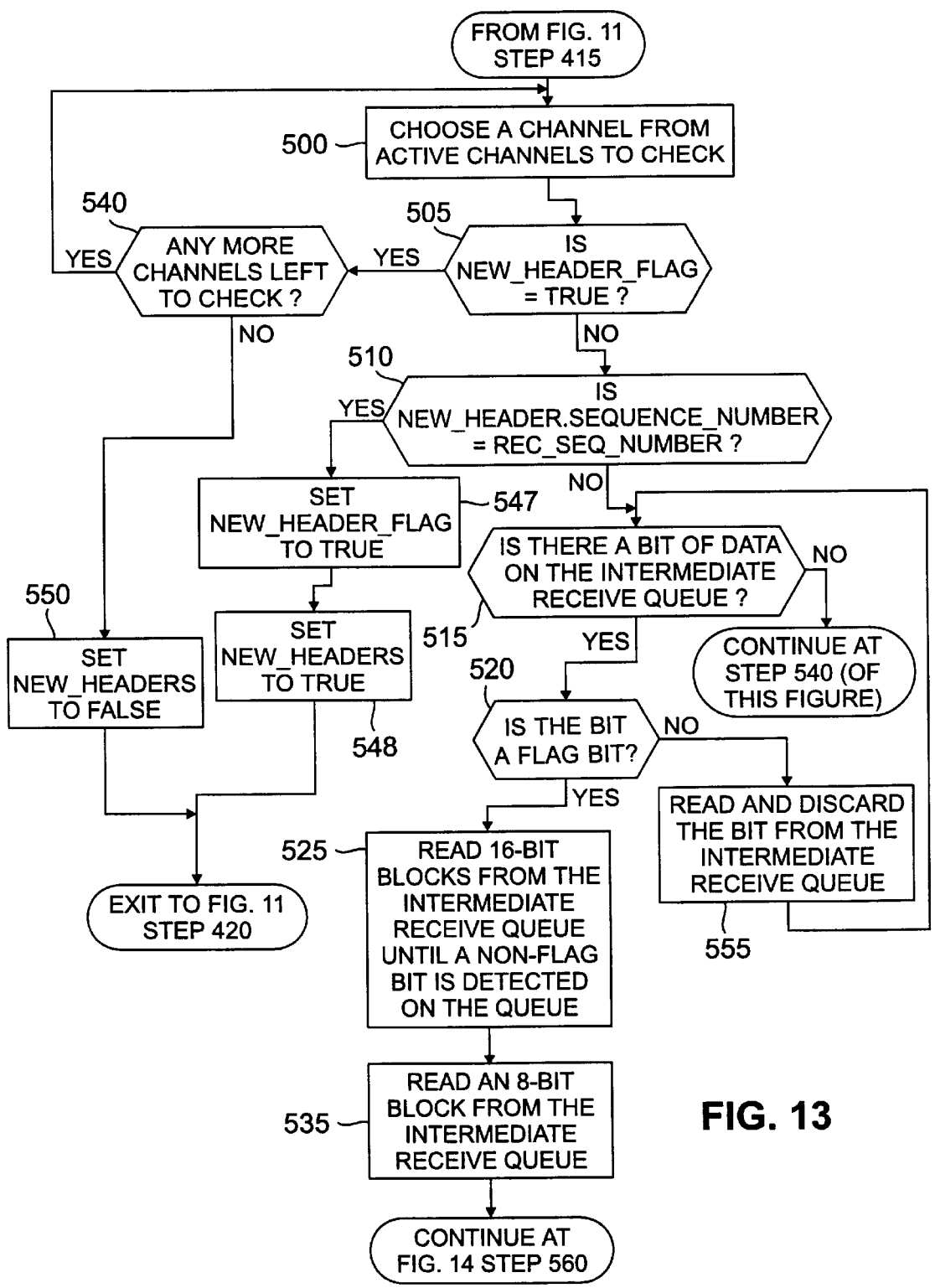

FIG. 13 is a flow chart of the steps taken in HUNT mode to determine if a new header is present. First a channel which has not yet been checked is selected (step 500). The NEW_HEADER_FLAG associated with that channel is checked (step 505). If it is TRUE then a new header has already been detected on this channel, and it is determined whether there are any more unchecked channels (step 540). If there are, control returns to step 500. If there are no more unchecked channels, then NEW_HEADERS is set to FALSE (step 550) and control returns to step 420.

If, at step 505, NEW_HEADER_FLAG is not true then the SEQUENCE_NUMBER element of the variable NEW_HEADER associated with the channel is compared with REC_SEQ_NUM (step 510). (The variable NEW_HEADER will have the value of the header most recently received on that channel). If the values are equal, then a previously received but not yet accounted for header is in NEW_HEADER. In this case, the variable NEW_HEADER_FLAG for this channel is set to true (step 547) the variable NEW_HEADERS is set to TRUE (step 548), and control returns to step 420.

If the values are not equal, then the intermediate receive queue associated with the channel is tested to determine whether new data is present (step 515). If no data is present, then control continues at step 540 (permitting any remaining unchecked channels to be checked). If data is present, it is determined whether the first bit on the queue is a FLAG bit (step 520). If it is not, the bit is read and discarded (step 555) and control returns to step 515.

Figure 14:
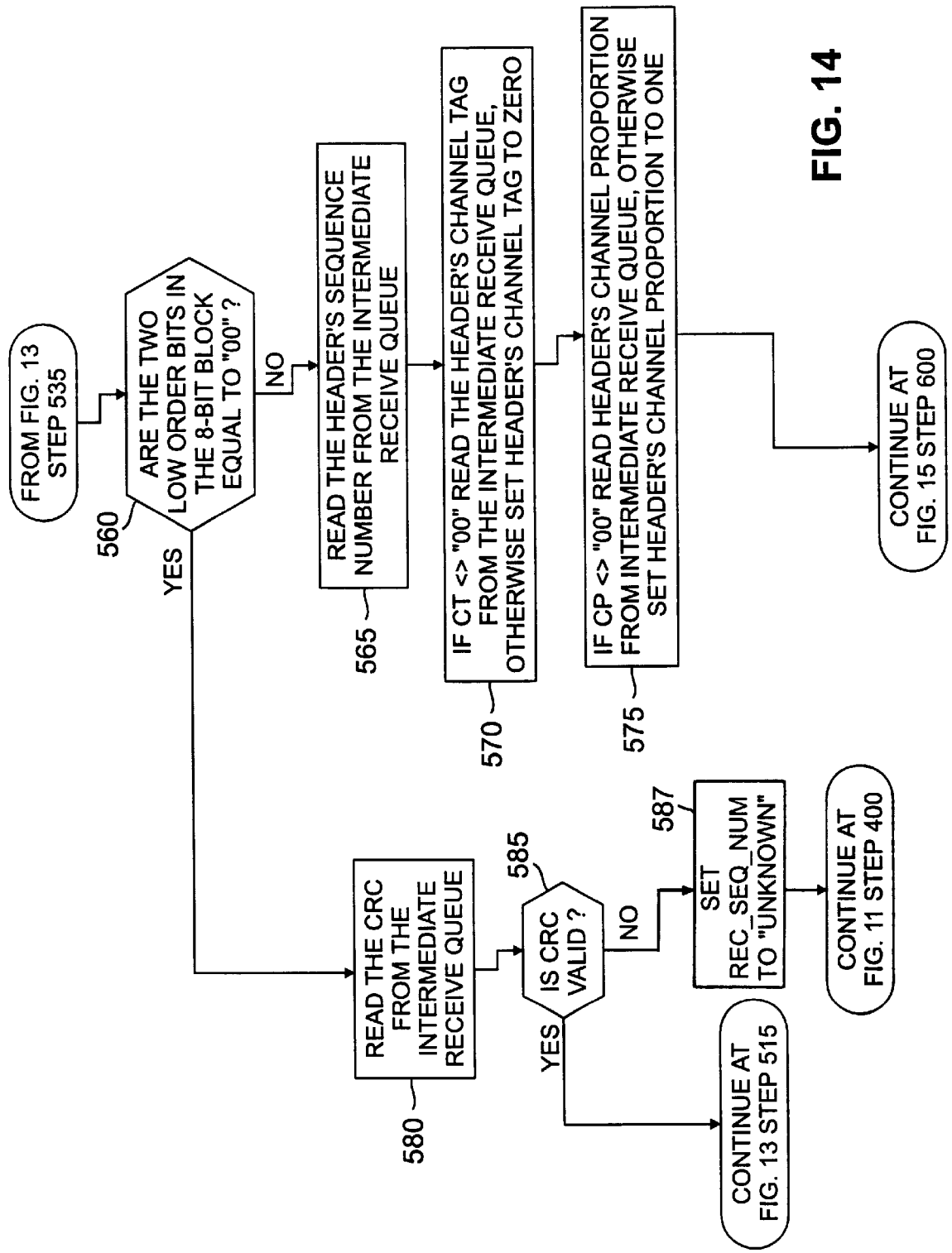

If the bit is a FLAG bit, then 16-bit blocks of data are read from the intermediate receive queue until a non-FLAG bit is detected (step 525). Upon the detection of a non-FLAG bit, a block of 8-bits is read from the queue (step 535). Referring to FIG. 14, the two low order bits of this block are compared with "00" (step 560). If the bits equal "00" then this is a probably dummy block. In that case, the CRC of the dummy block is read from the intermediate receive queue (step 580). The CRC is tested for validity (step 585). If it is invalid, an error has occurred, and HUNT mode is reset to search for a new header set by setting REC_SEQ_NUM to "unknown" (step 587) and continuing at step 400. If the CRC is valid, a dummy block has been read, and more data must now be read from the intermediate receive queue. Control thus returns to step 515.

Figure 15:
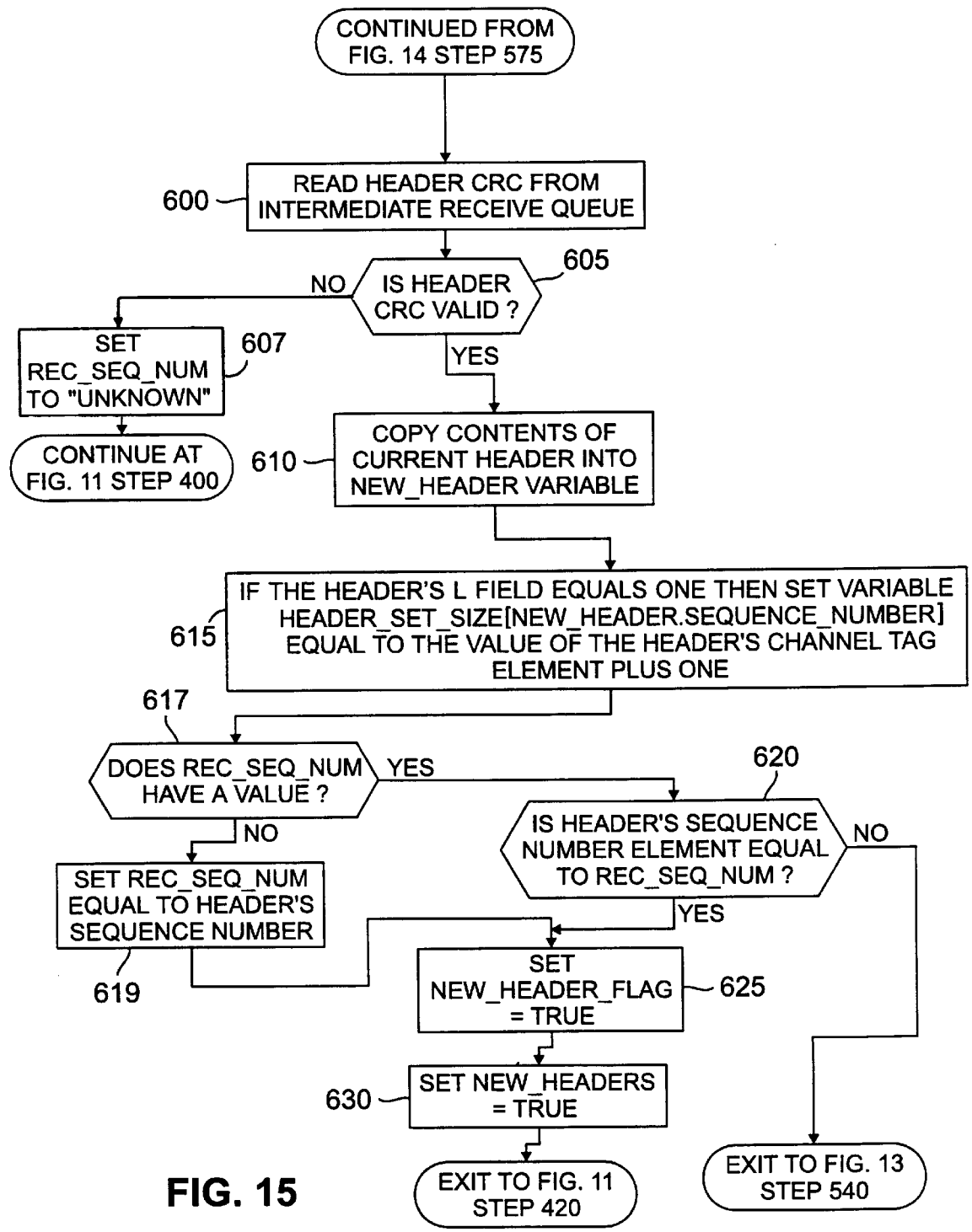

If, at step 560, the two low order bits of the block are not equal to "00", then the data is likely part of a header. In this case, the header's sequence number, channel tag, and channel proportion are read from the intermediate receive queue (steps 565, 570, and 575). Next, and referring to FIG. 15, the header's CRC is read (step 600). The CRC is tested (step 605). If it is invalid, there has been an error, and the search for a header set begins anew by setting REC_SEQ_NUM to "unknown" (step 670) and continuing at step 400. If the CRC is valid, the header is copied into the variable NEW_HEADER associated with the particular channel (step 610). If the header's L field equals one, then the header has the largest channel tag in the header set and HEADER_SET_SIZE[NEW_HEADER.SEQUENCE_NUMBER] is set to the value of the header's channel tag plus one (step 615).

Next, the variable REC_SEQ_NUM is checked to see if it has a value (step 617). If it has no value (that is, it is "unknown"), its value is set to the current header's sequence number (step 619), the NEW_HEADER_FLAG variable for the particular channel is set to TRUE (step 625), the variable NEW_HEADERS is set to true (step 630) and control returns to step 420. If REC_SEQ_NUM has a value, the header's sequence number is compared to REC_SEQ_NUM (step 620). If they are not the same, the header is not part of the currently being received header set (it may be part of a subsequent header set). In this case, control returns to step 540, to determine whether any other new headers for the current header set can be detected. If the values are equal, the variable NEW_HEADER_FLAG associated with the particular channel is set to TRUE (step 625) and the variable NEW_HEADERS is set to TRUE. Control then returns to step 420.

Figure 16:
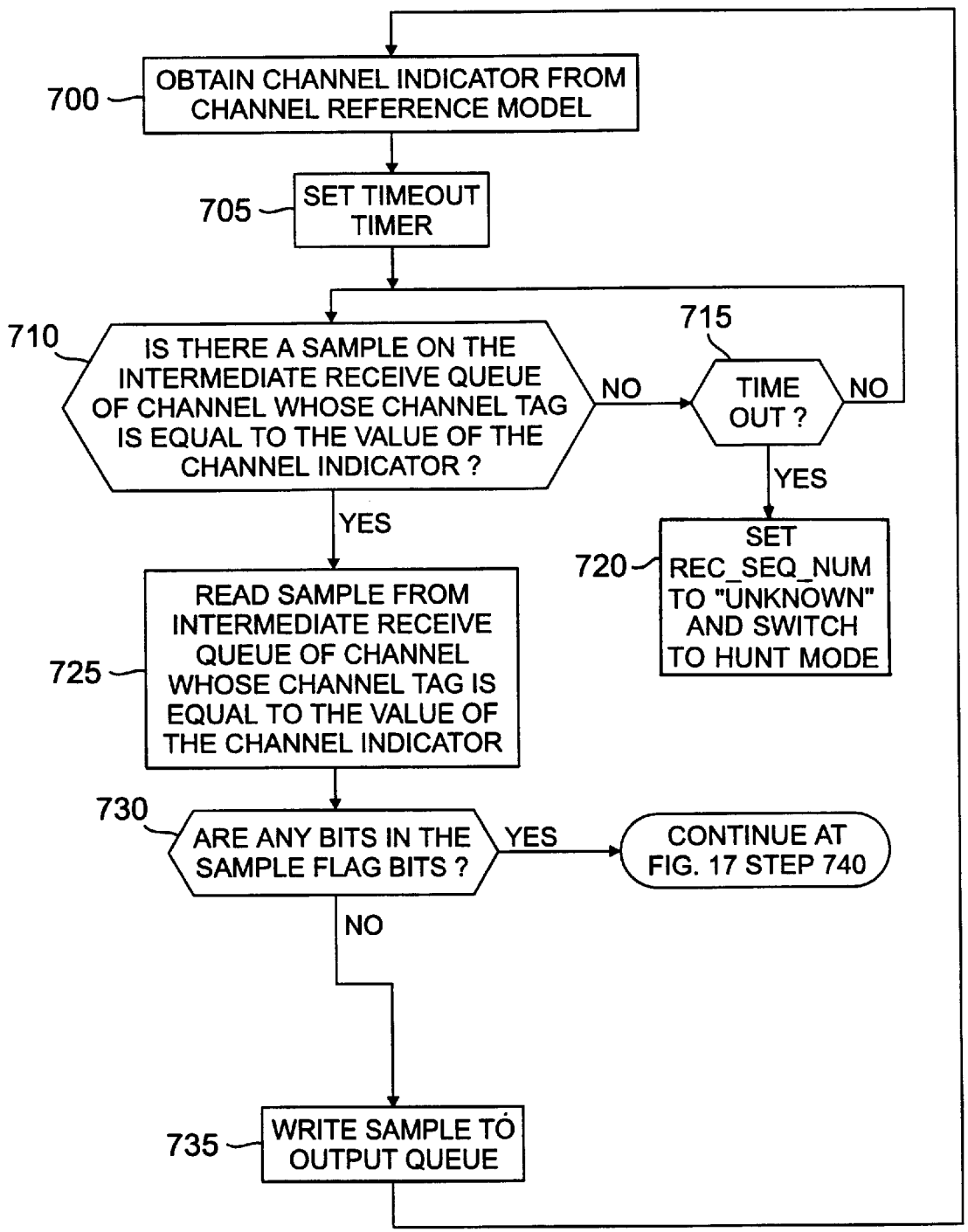
FIGS. 16, 17 and 18 are flow charts of the receive recombiner process in NORMAL mode according to the invention.

In NORMAL mode, and referring to FIG. 16, the receive recombiner obtains the next channel indicator from the Channel Reference Model (step 700) shown in FIG. 8. Then a timeout timer is set (step 705). The intermediate receive queue for the channel whose channel tag is equal to the value of the channel indicator is checked to see if a sample of data is present (step 710). If no data is present, the timeout timer is checked (step 715). If there has been a time out, a new header set must be received, REC_SEQ_NUM is set to "unknown", and the receive recombiner switches to HUNT mode (step 720). If there has not been a timeout, control returns to step 710.

Figure 17:
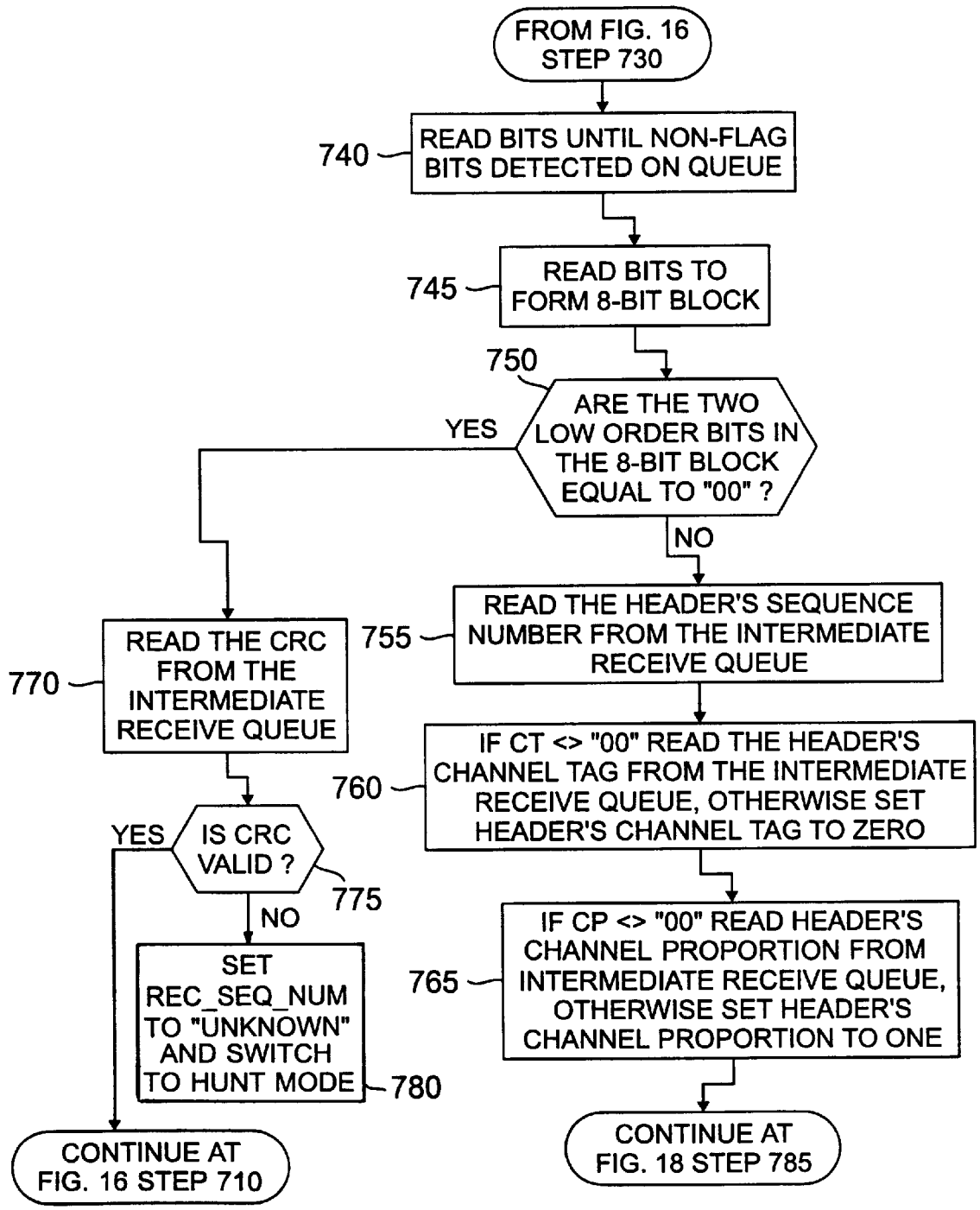

If, at step 710, a sample is detected on the intermediate receive queue, the sample is read (step 725). The sample is checked to determine whether any of its bits has been marked as a FLAG (step 730). If not, it is written to the output queue (step 735). If the sample is part of a FLAG then, referring to FIG. 17, bits are read from the intermediate receive queue until a non-FLAG bit is detected (step 740). Then the next seven bits are read, and, together with the first non-FLAG bit read, form an 8-bit block (step 745). The two low order bits of the block are compared with the value "00" (step 750).

If the two low order bits are equal to "00" the data is probably part of a dummy block. The dummy block's CRC is read from the intermediate receive queue (step 770) and then tested for validity (step 775). If it is invalid, an error has occurred and a new header set will be searched for by setting REC_SEQ_NUM to "unknown" and switching to HUNT mode (step 780). If the CRC is valid, the dummy block is ignored, and control returns to step 710.

Figure 18:
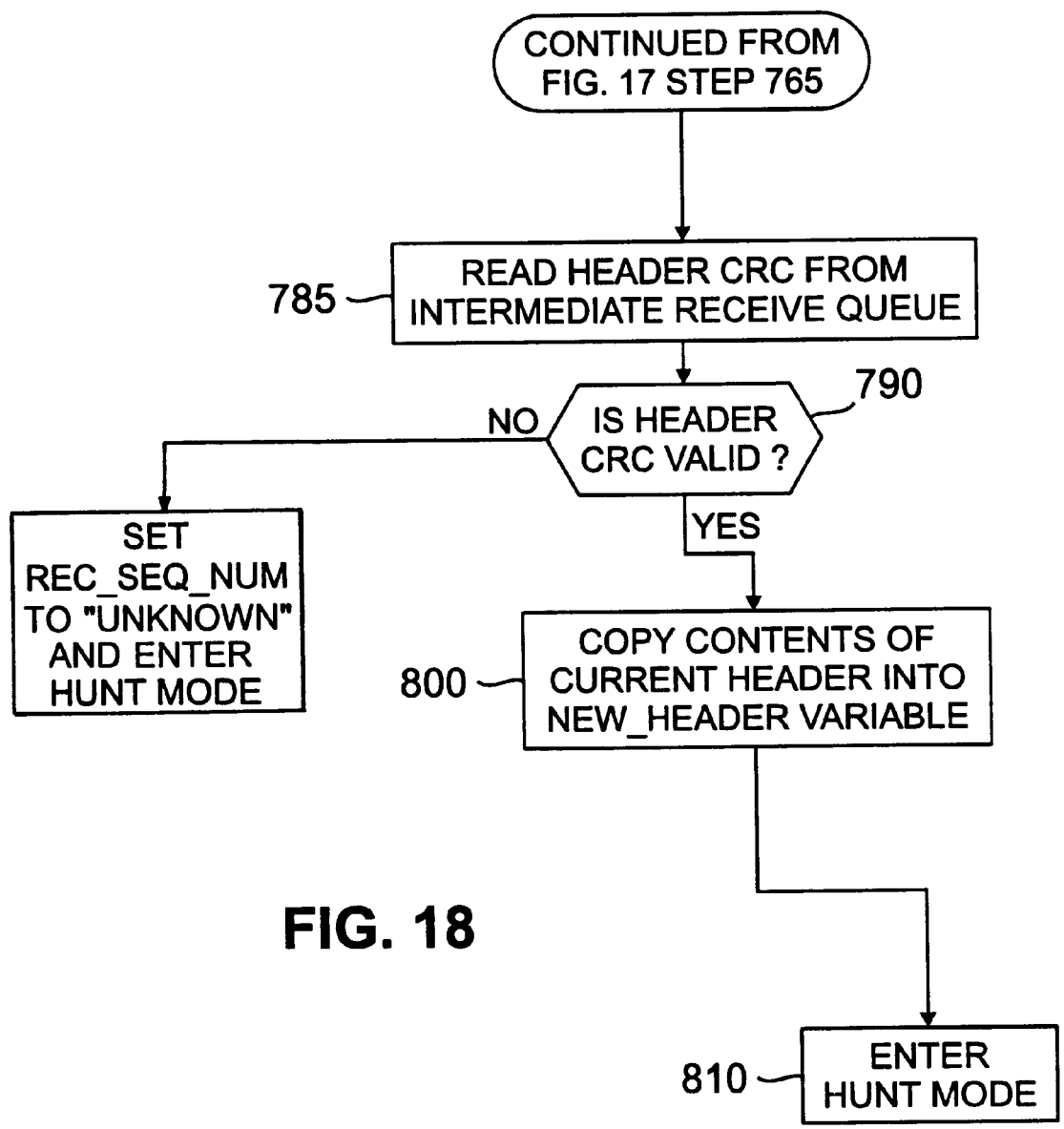

If the two lower order bits are not equal to "00" the data is probably part of a header. The header's sequence number, channel tag and channel proportion are read from the intermediate receive queue (steps 755, 760 and 765). Next, and referring to FIG. 18, the header's CRC is read from the intermediate receive queue (step 785) and tested for validity (step 790). If the CRC is invalid, an error has occurred, and REC_SEQ_NUM is set to "unknown" and the receive recombiner switches to HUNT mode (step 795).

If the CRC is valid, then the header is copied into the variable NEW_HEADER associated with the particular channel and the receive recombiner switches to HUNT mode to complete the reception of a new header set (step 810).

Additions, subtractions, and other modifications of the described illustrative embodiments will be apparent to those practiced in the field.

What is claimed is:

1. In a data transmission system having a plurality of data transmission channels, a transmitter and a receiver, a method for transmitting data samples comprising:
   (A) transmitting at the transmitter a first set of data over a first set of data transmission channels;
   (B) receiving at the receiver, from the first set of data transmission channels, the first set of data;
   (C) initializing a first set of state variables in the transmitter using the first set of data;
   (D) initializing a second set of state variables in the receiver using the first set of data;
   (E) repeatedly:
      (i) updating the first set of state variables to generate a first channel identifier;
      (ii) selecting a selected transmission channel from the first set of data transmission channels according to the value of the first channel identifier; and
      (iii) transmitting, from the transmitter to the receiver, a data sample over the selected data transmission channel; and (F) repeatedly:
   (i) updating the second set of state variables to generate a second channel identifier;
   (ii) selecting a selected data transmission channel from the first set of data transmission channels according to the value of the second channel identifier; and
   (iii) reading, at the receiver, a data sample from the selected data transmission channel.

2. The method of claim 1, wherein each channel in the first set of data transmission channels has an associated throughput rate, and wherein the first set of data comprises, for each channel in the first set of data transmission channels, a channel proportion value, proportional to the throughput rate of that channel.

3. The method of claim 2, wherein updating the first and the second set of state variables to generate first and second channel identifiers comprises:
   incrementing respective state variables associated with respective channels in the first set of data transmission channels by the channel proportion values associated with the respective channels;
   identifying the data transmission channel having the largest associated state variable;
   generating the channel identifier associated with the identified data transmission channel; and
   decrementing the state variable associated with the identified data transmission channel by an amount equal to the total of channel proportion parameters for each of the first set of data transmission channels.

4. The method of claim 1, wherein each channel in the first set of data transmission channels has an associated throughput rate, and wherein transmitting the first set of data over the set of data transmission channels comprises transmitting a header set comprising at least one header block transmitted over each of the first set of data transmission channels, and wherein for each channel the header block comprises:
   a channel proportion parameter proportional to the throughput of the channel over which the header block is transmitted.

5. The method of claim 1, wherein transmitting the first set of data over the set of data transmission channels comprises transmitting a header set comprising at least one header block transmitted over each of the first set of data transmission channels, and wherein for each channel the header block comprises:
   a header flag;
   a sequence number common to all of the header blocks in the header set;
   a channel tag identifying the channel over which the header block is transmitted; and
   information specifying whether the channel tag is the largest of the channel tags identifying channels in the first selected set of data transmission channels.

6. The method of claim 1, further comprising:
   (G) after performing steps (A)–(F), transmitting a second set of data over a second set of data transmission channels;
   (H) receiving at the receiver, from the second set of data transmission channels, the second set of data;
   (I) initializing the first set of state variables using the second set of data; and
   (J) initializing the second set of state variables using the second set of data.

7. The method of claim 5, wherein the step of transmitting a data sample from the transmitter to the receiver further comprises:
   in the transmitter, identifying an instance of a sequence of bits in the data sample identical to the sequence of bits in said header flag and modifying the identified sequence of bits to make the different from the sequence of bits in said header flag; and
   wherein the step of reading a data sample at the receiver further comprises:
   in the receiver, identifying the modified sequence of bits in the data sample and restoring the modified sequence of bits to a sequence of bits identical to the sequence of bits in said header flag.

8. The method of claim 6, wherein the second set of data transmission channels is the same as the first set of data transmission channels.

9. The method of claim 6, wherein the second set of data transmission channels differs from the first set of data transmission channels.

10. In a data transmission system having a plurality of data transmission channels, a transmitter and a receiver, a mechanism for transmitting data samples comprising:
   (A) means for transmitting at the transmitter a first set of data over a first set of data transmission channels;
   (B) means for receiving at the receiver, from the first set of data transmission channels, the first set of data;
   (C) means for initializing a first set of state variables in the transmitter using the first set of data;
   (D) means for initializing a second set of state variables in the receiver using the first set of data;
   (E) means for repeatedly:
      (i) updating the first set of state variables to generate a first channel identifier;
      (ii) selecting a selected transmission channel from the first set of data transmission channels according to the value of the first channel identifier; and
      (iii) transmitting, from the transmitter to the receiver, a data sample over the selected data transmission channel; and
   (F) means for repeatedly:
      (i) updating the second set of state variables to generate a second channel identifier;
      (ii) selecting a selected data transmission channel from the first set of data transmission channels according to the value of the second channel identifier; and
      (iii) reading, at the receiver, a data sample from the selected data transmission channel.

11. The mechanism of claim 10, wherein means for updating the first and the second set of state variables to generate first and second channel identifiers comprises:
   means for incrementing respective state variables associated with respective channels in the first set of data transmission channels by respective channel proportion values associated with the respective channels;
   means for identifying the data transmission channel having the largest associated state variable;
   means for generating the channel identifier associated with the identified data transmission channel; and
   means for decrementing the state variable associated with the identified data transmission channel by an amount equal to the total of channel proportion parameters for each of the first set of data transmission channels.

12. The mechanism of claim 10, wherein each channel in the first set of data transmission channels has an associated throughput rate, and wherein means for transmitting the first set of data over the set of data transmission channels comprises means for transmitting a header set comprising at least one header block transmitted over each of the first set of data transmission channels, and wherein for each channel the header block comprises:

a channel proportion parameter proportional to the throughput of the channel over which the header block is transmitted.

13. The mechanism of claim 10, wherein means for transmitting the first set of data over the set of data transmission channels comprises means for transmitting a header set comprising at least one header block transmitted over each of the first set of data transmission channels, and wherein for each channel the header block comprises:

a header flag;

a sequence number common to all of the header blocks in the header set;

a channel tag identifying the channel over which the header block is transmitted; and information specifying whether the channel tag is the largest of the channel tags identifying channels in the first selected set of data transmission channels.

14. The mechanism of claim 10, further comprising:

(G) means for transmitting a second set of data over a second set of data transmission channels;

(H) means for receiving at the receiver, from the second set of data transmission channels, the second set of data;

(I) means for initializing the first set of state variables using the second set of initialization data; and (J) means for initializing the second set of state variables using the second set of initialization data.

15. The mechanism of claim 13, wherein means for transmitting a data sample from the transmitter to the receiver further comprises:

means in the transmitter for identifying an instance of a sequence of bits in the data sample identical to the sequence of bits in said header flag and modifying the identified sequence of bits to make the identified sequence different from the sequence of bits in said header flag; and wherein means for reading a data sample at the receiver further comprises:

means in the receiver, for identifying the modified sequence of bits in the data sample and restoring the modified sequence of bits to a sequence of bits identical to the sequence of bits in said header flag.

16. The mechanism of claim 14, wherein the second set of data transmission channels is the same as the first set of data transmission channels.

17. The mechanism of claim 14, wherein the second set of data transmission channels differs from the first set of data transmission channels.

18. A software product, residing on a machine readable medium, for controlling a data transmission system having a plurality of data transmission channels, a transmitter and a receiver, comprising instructions for causing the system to:

(A) transmit at the transmitter a first set of data over a first set of data transmission channels;

(B) receive at the receiver, from the first set of data transmission channels, the first set of data;

(C) initialize a first set of state variables in the transmitter using the first set of data;

(D) initialize a second set of state variables in the receiver using the first set of data;

(E) repeatedly:

(i) update the first set of state variables to generate a first channel identifier;

(ii) select a selected transmission channel from the first set of data transmission channels according to the value of the first channel identifier; and (iii) transmit, from the transmitter to the receiver, a data sample over the selected data transmission channel; and (F) repeatedly:

(i) update the second set of state variables to generate a second channel identifier;

(ii) select a selected data transmission channel from the first set of data transmission channels according to the value of the second channel identifier; and (iii) read, at the receiver, a data sample from the selected data transmission channel.

19. The software product of claim 18, wherein each channel in the first set of data transmission channels has an associated throughput rate, and wherein the first set of data comprises, for each channel in the first set of data transmission channels, a channel proportion value, proportional to the throughput rate of that channel.

20. The software product of claim 19, wherein the instructions for causing the system to update the first and the second set of state variables to generate first and second channel identifiers comprises instructions for causing the system to:

increment respective state variables associated with respective channels in the first set of data transmission channels by the respective channel proportion values associated with the respective channels;

identify the data transmission channel having the largest associated state variable;

generate the channel identifier associated with the identified data transmission channel; and decrement the state variable associated with the identified data transmission channel by an amount equal to the total of channel proportion parameters for each of the first set of data transmission channels.

21. The software product of claim 18, wherein each channel in the first set of data transmission channels has an associated throughput rate, and wherein the instructions for causing the system to transmit a first set of data over the set of data transmission channels comprises instructions for causing the system to transmit a header set comprising at least one header block transmitted over each of the first set of data transmission channels, and wherein for each channel the header block comprises:

a channel proportion parameter proportional to the throughput of the channel over which the header block is transmitted.

22. The software product of claim 18, wherein the instructions for causing the system to transmit the first set of data over the set of data transmission channels comprises instructions for causing the system to transmit a header set comprising at least one header block transmitted over each of the first set of data transmission channels, and wherein for each channel the header block comprises:

a header flag;

a sequence number common to all of the header blocks in the header set;

a channel tag identifying the channel over which the header block is transmitted; and information specifying whether the channel tag is the largest of the channel tags identifying channels in the first selected set of data transmission channels.

23. The software product of claim 18, further comprising instructions for causing the system to:
- (G) after executing instructions causing the system to perform steps (A)–(F), transmit a second set of data over a second set of data transmission channels;
- (H) receive at the receiver, from the second set of data transmission channels, the second set of data;
- (I) initialize the first set of state variables using the second set of data; and
- (J) initialize the second set of state variables using the second set of data.

24. The software product of claim 23, wherein the instructions for causing the system to transmit a data sample from the transmitter to the receiver further comprise instructions for causing the system to:
- in the transmitter, identify an instance of a sequence of bits in the data sample identical to the sequence of bits in said header flag and modifying the identified sequence of bits to make the identified sequence different from the sequence of bits in said header flag; and
- wherein the instructions for causing the system to read a data sample at the receiver further comprises instructions for causing the system to:
  - in the receiver, identify the modified sequence of bits in the data sample and restoring the modified sequence of bits to a sequence of bits identical to the sequence of bits in said header flag.

25. The software product of claim 23, wherein the second set of data transmission channels is the same as the first set of data transmission channels.

26. The software product of claim 23, wherein the second set of data transmission channel differs from the first set of data transmission channels.

27. A method for transmitting a stream of data from a transmitter to a receiver comprising:
- initializing corresponding sets of state variables associated respectively with the transmitter and the receiver based on a first set of data;
- repeatedly transmitting sequential samples of data from the stream of data from the transmitter to the receiver over channels selected from a set of communication channels, the channel for transmitting a given sample of data being selected by updating the respective sets of state variables based on information in the first set of data;
- transmitting a second set of data, different from the first set of data, between the transmitter and the receiver;
- initializing corresponding sets of state variables associated respectively with the transmitter and the receiver based on the second set of data;
- repeatedly transmitting sequential samples of data from the stream of data from the transmitter to the receiver over channels selected from the set of communication channels, the channel for transmitting a given sample of data being selected by updating the respective sets of state variables based on the second set of data.

28. The method of claim 27, wherein the first set of data and the second set of data contain information about relative data transmission rates through respective channels, and wherein the information in the second set of data about relative data transmission rates is different from the information in the first set of data about relative data transmission rates.

29. The method of claim 27, wherein the second plurality of communication channels differs from the first plurality of communication channels.

30. The method of claim 29, further comprising changing the set of communication channels based on the second set of data.

31. The method of claim 27, wherein the throughput of the communication channels in the first plurality of communication channels is repeatedly monitored, and wherein the second set of data reflects a change in the throughput of at least one communication channel compared to throughput reflected in the first set of data.

32. The method of claim 27, wherein the availability of potentially available communication channels between the transmitter and the receiver is repeatedly monitored, and wherein the second set of data reflects a change in the availability of at least one communication channel compared to the availability reflected in the first set of data.

33. The method of claim 27, wherein the second set of data is transmitted with a header flag to distinguish said second set of data from the sequential samples of data, and wherein data in the sequential samples of data are modified in the transmitter to distinguish said sequential samples from the header flag, and wherein the modified samples are restored to the original state of the sequential samples in the receiver.

* * * * *